(12) United States Patent
Ono

(10) Patent No.: US 11,641,045 B2
(45) Date of Patent: May 2, 2023

(54) ION TRAPPING AGENT, SEPARATOR FOR LITHIUM ION BATTERY, AND LITHIUM ION SECONDARY BATTERY

(71) Applicant: TOAGOSEI CO., LTD., Minato-ku (JP)

(72) Inventor: Yasuharu Ono, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 263 days.

(21) Appl. No.: 16/770,407

(22) PCT Filed: Dec. 4, 2018

(86) PCT No.: PCT/JP2018/044497
§ 371 (c)(1),
(2) Date: Jul. 10, 2020

(87) PCT Pub. No.: WO2019/116959
PCT Pub. Date: Jun. 20, 2019

(65) Prior Publication Data
US 2021/0143512 A1 May 13, 2021

(30) Foreign Application Priority Data

Dec. 15, 2017 (JP) .............................. JP2017-240140

(51) Int. Cl.
*H01M 50/00* (2021.01)
*H01M 50/489* (2021.01)
(Continued)

(52) U.S. Cl.
CPC ..... *H01M 50/489* (2021.01); *H01M 10/0525* (2013.01); *H01M 10/0567* (2013.01); *H01M 50/409* (2021.01); *H01M 50/431* (2021.01);

*H01M 50/443* (2021.01); *H01M 50/449* (2021.01); *H01M 50/417* (2021.01)

(58) Field of Classification Search
CPC ........ H01M 10/0567; H01M 10/0525; H01M 50/431; H01M 4/5825; H01M 50/489; H01M 50/449
See application file for complete search history.

(56) References Cited

U.S. PATENT DOCUMENTS

| 2006/0166085 | A1* | 7/2006 | Hennige | ............... | H01M 50/44 427/421.1 |
| 2009/0220840 | A1* | 9/2009 | Yamaguchi | ............ | H01B 1/122 977/773 |

(Continued)

FOREIGN PATENT DOCUMENTS

| JP | 2000-77103 A | 3/2000 |
| JP | 2010-129430 A | 6/2010 |

(Continued)

*Primary Examiner* — Cynthia H Kelly
*Assistant Examiner* — Monique M Wills
(74) *Attorney, Agent, or Firm* — Bulkley, Richardson and Gelinas, LLP; Mary R. Bonzagni

(57) ABSTRACT

An ion trapping agent which is a layered phosphate compound that includes a proton as an ion exchange group, that supports lithium ions in excess of a theoretical exchange capacity of the layered phosphate compound, and that has no water of crystallization; and a separator for a lithium ion battery or a lithium ion secondary battery containing the ion trapping agent.

11 Claims, 2 Drawing Sheets

(51) Int. Cl.
*H01M 50/449* (2021.01)
*H01M 50/431* (2021.01)
*H01M 10/0525* (2010.01)
*H01M 10/0567* (2010.01)
*H01M 50/443* (2021.01)
*H01M 50/409* (2021.01)
H01M 50/417 (2021.01)

(56) References Cited

U.S. PATENT DOCUMENTS

2009/0272293 A1 11/2009 Ono
2018/0166749 A1 6/2018 Ono et al.

FOREIGN PATENT DOCUMENTS

| JP | 2013-105673 A | | 5/2013 | |
|---|---|---|---|---|
| JP | 2013-127955 A | | 6/2013 | |
| KR | 20140146517 A | * | 12/2014 | ............. C01B 25/45 |
| WO | WO-2004021477 A1 | * | 3/2004 | ............. H01B 1/122 |
| WO | 2012/124222 A1 | | 9/2012 | |
| WO | 2016/194995 A1 | | 12/2016 | |

* cited by examiner

ION TRAPPING AGENT, SEPARATOR FOR LITHIUM ION BATTERY, AND LITHIUM ION SECONDARY BATTERY

RELATED APPLICATIONS

This application claims priority to PCT Application No. PCT/JP2018/044497, filed Dec. 4, 2018, which claims priority to Japanese Patent Application No. 2017-240140, filed Dec. 15, 2017, both of which are incorporated herein by reference in their entirety.

TECHNICAL FIELD

The present invention relates to anion trapping agent, a separator for a lithium ion battery, and a lithium ion secondary battery.

BACKGROUND ART

Lithium ion secondary batteries are attracting attention as high input/output power sources for electric vehicles, hybrid electric vehicles, and the like, since lithium ion secondary batteries are lighter and exhibit higher input/output characteristics than other secondary batteries such as nickel hydrogen batteries and lead storage batteries.

However, when impurities (magnetic impurities such as Fe, Ni, Mg, or Cu, or ions thereof) are present in materials constituting batteries, lithium that constitutes a positive electrode may deposite on a negative electrode during charging and discharging. For example, lithium dendride deposited on a negative electrode may break a separator to reach a positive electrode, which may cause a short circuit.

Further, usage temperature of lithium ion secondary batteries may become from 40° C. to 80° C., when used in a car in summer. In such cases, a metal such as manganese may elute from a lithium-containing metal oxide that is a constituent material of a positive electrode, to deposit on a negative electrode, which may degrade the characteristics (capacity and the like) of a battery.

To address these problems, for example, Patent Document 1 discloses a lithium ion secondary battery that includes a trapping material having a function of trapping, by absorption, binding, or adsorption, impurities or by-products generated inside the lithium ion secondary battery, and discloses activated carbon, silica gel, zeolite, and the like as an example of the trapping material.

Further, for example, Patent Document 2 discloses a non-aqueous lithium ion secondary battery in which: a positive electrode that includes, as a positive electrode active material, a lithium compound containing Fe or Mn as a metal element in a constituent element, and a negative electrode that includes, as a negative electrode active material, a carbon material capable of storing and releasing lithium ions, are disposed separately in a non-aqueous electrolyte; and the positive electrode contains zeolite in an amount of from 0.5 to 5 wt % with respect to the positive electrode active material, the zeolite having an effective pore size that is larger than an ionic radius of the metal element and is 0.5 nm (5 Å) or less.

Furthermore, Patent Documents 3 to 5 each disclose an aluminum silicate of a specific composition and structure, a lithium ion secondary battery using the same, and a member.

CITATION LIST

Patent Documents

Patent Document 1: Japanese Patent Application Laid-Open (JP-A) No. 2000-77103
Patent Document 2: JP-A No. 2010-129430
Patent Document 3: International Application Publication No. 2012/124222
Patent Document 4: JP-A No. 2013-105673
Patent Document 5: JP-A No. 2013-127955

SUMMARY OF INVENTION

Technical Problem

A problem to be solved by one embodiment of the present invention is to provide an ion trapping agent that traps impurities generated inside a battery with high efficiency.

A problem to be solved by another embodiment of the present invention is to provide a separator for a lithium ion battery or a lithium ion secondary battery that contains the ion trapping agent, suppresses deterioration of battery characteristics overtime, and suppresses a decrease in battery capacity.

Solution to Problem

The inventor has conducted various studies to improve adsorption rate of impurities, and has found that an ion trapping agent for a lithium ion secondary battery, the ion trapping agent being a layered phosphate compound that includes a proton as an ion exchange group, that supports lithium ions in excess of a theoretical exchange capacity of the layered phosphate compound, and that has no water of crystallization can trap impurities at high rate. Based on such findings, the following means is provided herein.

<1> An ion trapping agent which is a layered phosphate compound that includes a proton as an ion exchange group, that supports lithium ions in excess of a theoretical exchange capacity of the layered phosphate compound, and that has no water of crystallization.

<2> The ion trapping agent according to <1>, in which amass ratio (Li/PO$_4$) of lithium atoms with respect to phosphate groups PO$_4$ contained in the layered phosphate compound is 0.07 or more.

<3> The ion trapping agent according to <1> or <2>, in which a specific surface area of the layered phosphate compound is 15 m$^2$/g or more.

<4> The ion trapping agent according to anyone of <1> to <3>, in which a moisture content of the layered phosphate compound is 1% by mass or less.

<5> The ion trapping agent according to anyone of <1> to <4>, in which the layered phosphate compound is α-zirconium phosphate or α-titanium phosphate.

<6> A separator for a lithium ion battery, the separator including anion trapping layer that contains the ion trapping agent according to any one of <1> to <5>.

<7> A lithium ion secondary battery including a positive electrode, a negative electrode, and an electrolyte, the lithium ion secondary battery containing the ion trapping agent according to any one of <1> to <5>.

Advantageous Effects of Invention

According to one embodiment of the present invention, anion trapping agent that traps impurities generated inside a battery with high efficiency can be provided.

According to another embodiment of the present invention, a separator for a lithium ion battery or a lithium ion secondary battery that contains the ion trapping agent, suppresses deterioration of battery characteristics over time, and suppresses a decrease in battery capacity can be provided.

DESCRIPTION OF EMBODIMENTS

Figure 1:
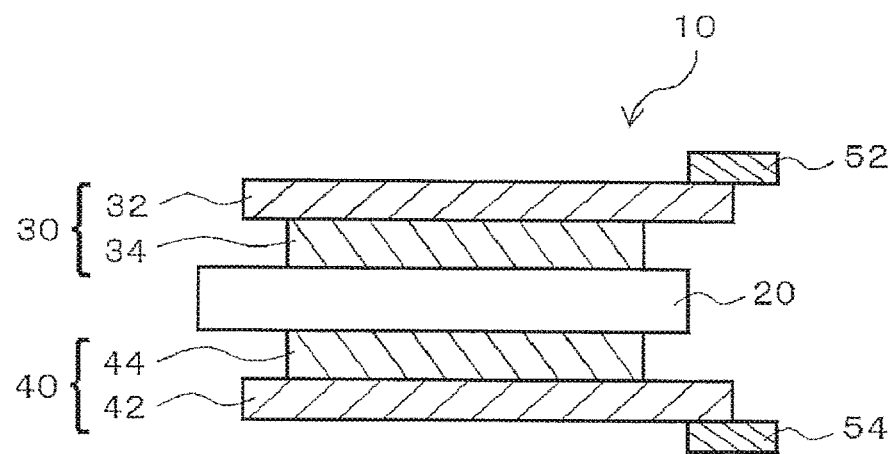
FIG. 1 is a schematic diagram showing one example of a storage element with lead constituting the lithium ion secondary battery of the present embodiment.

Hereinafter, the present embodiment will be described in detail.

Unless otherwise specified, "%" means "% by mass", "part(s)" means "part(s) by mass", and "ppm" means "ppm by mass". In the present embodiment, the description "from X (lower limit) to Y (upper limit)" that represents a numerical range means "X (lower limit) or more and Y (upper limit) or less", and the description "from Y (upper limit) to X (lower limit)" that represents a numerical range means "Y (upper limit) or less and X (lower limit) or more". In other words, each of these descriptions represents a numerical range that includes Y (upper limit) and X (lower limit). Furthermore, in the present embodiment, a combination of two or more of preferred aspects, which will be described below, is also a preferred aspect.

The ion trapping agent of the present embodiment is a layered phosphate compound that includes a proton as an ion exchange group, that supports lithium ions in excess of a theoretical exchange capacity of the layered phosphate compound, and that has no water of crystallization. The ion trapping agent of the present embodiment may be composed of a layered phosphate compound that includes a proton as an ion exchange group, that supports lithium ions in excess of a theoretical exchange capacity of the layered phosphate compound, and that has no water of crystallization, or may be composed of the layered phosphate compound and another compound. The above-described metal ions are derived from impurities that are present in components of a lithium ion secondary battery, or metals that elute from a positive electrode under high temperature.

Since the ion trapping material of the present embodiment has a high rate of trapping unnecessary metal ions in a lithium ion secondary battery such as manganese ions ($Mn^{2+}$), nickel ions ($Ni^{2+}$), copper ions ($Cu^{2+}$), or iron ions ($Fe^{2+}$), these metal ions that may cause a short circuit can be efficiently trapped.

The layered phosphate compound before the ion exchange groups are replaced with lithium ions is a layered compound and has a large amount of OH groups in the layer. The layered phosphate compound that includes a proton as an ion exchange group, that supports lithium ions in excess of a theoretical exchange capacity of the layered phosphate compound, and that has no water of crystallization is also a layered compound. By including an ion trapping agent that contains the lithium ion-containing phosphate compound in, for example, an electrolyte or a separator, it is possible to selectively trap manganese ions, nickel ions, or the like without trapping lithium ions in the electrolyte.

Furthermore, since the ion trapping agent of the present embodiment provides a neutral liquid, the pH does not fluctuate significantly even when the agent is added to an electrolyte. Specifically, when an alkaline substance is included in an electrolyte, there occurs a problem that the electrolyte easily decomposes to form lithium carbonate as the pH rises and the resistance of the electrolyte is increased, but the ion trapping agent of the present embodiment does not cause such a problem. Since the ion trapping agent of the present embodiment is an inorganic substance, the agent has excellent thermal stability and stability in an organic solvent. Therefore, when the ion trapping agent is included in a component of a lithium ion secondary battery, the agent can be present stably during charging and discharging.

The present embodiment is as follows.

An ion trapping agent which is a layered phosphate compound that includes a proton as an ion exchange group, that supports lithium ions in excess of a theoretical exchange capacity of the layered phosphate compound, and that has no water of crystallization.

The lithium ion-containing phosphate compound is as follows.

(A) α-zirconium phosphate in which all of ion exchange groups are replaced with lithium ions, lithium ions in excess of a theoretical exchange capacity of the layered phosphate compound including a proton as an ion exchange group are supported, and water of crystallization is removed (B) α-titanium phosphate in which all of ion exchange groups are replaced with lithium ions, lithium ions in excess of a theoretical exchange capacity of the layered phosphate compound including a proton as an ion exchange group are supported, and water of crystallization is removed The ion trapping agent of the present embodiment may include one, or two or more of these The above-described component (A) is a substitution product of α-zirconium phosphate with lithium ions.

The ion exchange group of the above-mentioned α-zirconium phosphate (α-zirconium phosphate $Zr(HPO_4)_2 \cdot H_2O$ before substitution) is usually a proton, and the theoretical ion exchange capacity is 6.64 meq/g. All of the protons are replaced with lithium ions, the lithium ions in excess of the theoretical exchange capacity of the layered phosphate compound including a proton as an ion exchange group are supported, and water of crystallization is removed, which forms the above-described component (A).

The α-zirconium phosphate is preferably a compound represented by the following Formula (1).

$$ZrO_2 \cdot nP_2O_5 \cdot xLi_2O \quad (1)$$

(In Formula (1), n is a positive number of from 0.5 to 1.5, x is a positive number of from 0.8 to 2.2, and n is equal to or smaller than x.)

An amount of lithium ions substituted with respect to the compound of Formula (1) is preferably 6.7 meq/g or more, and more preferably from 7.5 to 15 meq/g. From the viewpoint of the ability to trap $Co^{2+}$ ions, $Mn^{2+}$ ions, or the like, the amount is particularly preferably from 8 to 12 meq/g.

A ratio ($Li/PO_4$) of the mass of lithium atoms substituted with respect to the compound of Formula (1) to the mass of phosphoric acid groups ($PO_4$) determined by converting, into $PO_4$, the number of phosphorus atoms that are contained in the compound of Formula (1) is preferably 0.07 or more, and more preferably from 0.073 to 0.34. An upper limit thereof is preferably 0.35 or less. The mass ratio ($Li/PO_4$) is particularly preferably from 0.10 to 0.33 from the viewpoint of the balance between the ability to trap $Co^{2+}$ ions, $Mn^{2+}$ ions, or the like, and other physical properties. By excessively adding Li, a part of bonding between $ZrO_6$ octahedrons and $PO_4$ tetrahedrons of α-zirconium phosphate is unlinked, and lithium ions can be excessively incorporated thereinto, the ability to trap $Co^{2+}$ ions, $Ni^{2+}$ ions, or the like are improved, as a result of which the ion trapping rate can be improved.

The method of producing the component (A) is not particularly limited, and examples thereof include a method in which α-zirconium phosphate is added to a lithium hydroxide aqueous solution, stirred for a certain period of time, filtered, washed, and dried, and then calcined at a high temperature to remove water of crystallization. A concentration of the LiOH aqueous solution is not particularly limited. When the concentration is high, the basicity of a reaction liquid is high, and α-zirconium phosphate may be partially eluted. Therefore, the concentration is preferably 1 mol/L or less. The calcination temperature is preferably from 350° C. to 550° C. When the temperature is 350° C. or higher, water of crystallization that may adversely affect a battery does not remain, and when the temperature is 550° C. or lower, zirconium phosphate is not decomposed.

The above-described component (B) is a substitution product of α-titanium phosphate with lithium ions.

The ion exchange group of the above-mentioned α-titanium phosphate (α-titanium phosphate $Ti(HPO_4)_2 \cdot H_2O$ before substitution) is usually a proton, and the theoretical ion exchange capacity is 7.76 meq/g. All of the protons are replaced with lithium ions, the lithium ions in excess of the theoretical exchange capacity of the layered phosphate compound including a proton as an ion exchange group are supported, and water of crystallization is removed, which forms the above-described component (B).

The α-titanium phosphate is preferably a compound represented by the following Formula (2).

$$TiO_2 \cdot xP_2O_5 \cdot nLi_2O \qquad (2)$$

(In Formula (2), n is a positive number of from 0.5 to 1.5, x is a positive number of from 0.8 to 2.2, and n is equal to or smaller than x.)

An amount of lithium ions substituted with respect to the compound of Formula (2) is preferably 7.4 meq/g or more, and more preferably from 7.5 to 15 meq/g. From the viewpoint of the ability to trap $Co^{2+}$ ions, $Mn^{2+}$ ions, or the like, the amount is particularly preferably from 8 to 12 meq/g.

A ratio ($Li/PO_4$) of the mass of lithium atoms substituted with respect to the compound of Formula (2) to the mass of acid groups ($PO_4$) determined by converting, into $PO_4$, the number of phosphorus atoms that are contained in the compound of Formula (1) is preferably 0.07 or more, and more preferably from 0.073 to 0.34. An upper limit thereof is preferably 0.35 or less. The mass ratio ($Li/PO_4$) is particularly preferably from 0.10 to 0.33 from the viewpoint of the ability to trap $Co^{2+}$ ions, $Mn^{2+}$ ions, or the like. By excessively adding Li, a part of bonding between $TiO_6$ octahedrons and $PO_4$ tetrahedrons of α-titanium phosphate is unlinked, and lithium ions can be excessively incorporated thereinto, the ability to trap $Co^{2+}$ ions, $Ni^{2+}$ ions, or the like are improved, as a result of which the ion trapping rate can be improved.

The method of producing the component (B) is not particularly limited, and examples thereof include a method in which α-titanium phosphate is added to a lithium hydroxide aqueous solution, stirred for a certain period of time, filtered, washed, and dried, and then calcined at a high temperature to remove water of crystallization. A concentration of the LiOH aqueous solution is not particularly limited. When the concentration is high, the basicity of a reaction liquid is high, and α-titanium phosphate may be partially eluted. Therefore, the concentration is preferably 1 mol/L or less. The calcination temperature is preferably from 350° C. to 550° C. When the temperature is 350° C. or higher, water of crystallization that may adversely affect a battery does not remain, and when the temperature is 550° C. or lower, zirconium phosphate is not decomposed.

The lithium ion-containing layered phosphate compound usually has a layered structure and, from the viewpoint of the ion trapping property for $Co^{2+}$ ions, $Mn^{2+}$ ions, or the like, and the dispersibility in liquid, an upper limit of the median particle diameter is preferably 5.0 μm, more preferably 3.0 μm, more preferably 2.0 μm, and still more preferably 1.0 μm, and a lower limit thereof is preferably 0.03 μm, and more preferably 0.05 μm. A preferred particle size may be selected depending on the type of component to which an ion trapping agent is applied.

From the viewpoint of the ion trapping property for $Co^{2+}$ ions, $Mn^{2+}$ ions, or the like, and the dispersibility in liquid, a BET specific surface area of the lithium ion-containing layered phosphate compound is preferably 15 $m^2/g$ or more, more preferably from 15 $m^2/g$ to 200 $m^2/g$, and further preferably from 30 $m^2/g$ to 150 $m^2/g$.

The BET specific surface area of the lithium ion-containing layered phosphate compound is measured in accordance with JIS R1626 "Measuring methods for the specific surface area of fine ceramic powders by gas adsorption using the BET method" using "AUTOSORB-1" (model name) manufactured by Quantachrome Corporation.

As described above, the ion trapping agent of the present embodiment may be composed of a lithium ion-containing layered phosphate compound and other compound. Examples of the other compound include another ion trapping agent, a binder such as a resin, water, and an organic solvent.

A moisture content of the ion trapping agent of the present embodiment is preferably 1% by mass or less, and more preferably 0.5% by mass or less. When the moisture content is 1% by mass or less, there is little risk of decomposition of an electrolyte that results in generation of gas. A lower limit of the moisture content is 0% by mass. The moisture content can be measured by the Karl Fischer method.

The method of setting the moisture content of the ion trapping agent to 10% by mass or less is not particularly limited, and a method of drying powder that is used can be applied. Examples thereof include a method of heating at a temperature of from 100° C. to 300° C. for about from 6 to 24 hours under atmospheric pressure or a reduced pressure.

The ion trapping agent of the present embodiment can be utilized for a positive electrode, a negative electrode, an electrolyte, or a separator that constitutes a lithium ion secondary battery. Among these, the agent is particularly preferably utilized for a positive electrode, an electrolyte, or a separator. The lithium ion secondary battery of the present embodiment includes a positive electrode, a negative electrode, an electrolyte, and a separator, and is characterized in that at least one of the positive electrode, the negative electrode, the electrolyte, or the separator contains the ion trapping agent for a lithium ion secondary battery of the present embodiment. The lithium ion secondary battery of the present embodiment may further include other component.

The structure of the lithium ion secondary battery is not particularly limited, and a structure in which storage elements composed of a positive electrode, a negative electrode, and a separator are wound in a flat spiral shape to form a wound electrode plate group, or these are layered in the form of a flat plate to form a layered electrode plate group, and the obtained electrode plate group is then enclosed in a packaging material is generally used.

FIG. 1 is an example of a storage element with leads enclosed in a packaging material. The storage element 10 is a wound body that is obtained by winding a pair of electrodes (positive electrode 30 and negative electrode 40) that are arranged facing each other with a separator 20 sandwiched therebetween. The positive electrode 30 includes a positive electrode active material layer 34 on a positive electrode current collector 32, and the negative electrode 40 includes a negative electrode active material layer 44 on a negative electrode current collector 42. The positive electrode active material layer 34 and the negative electrode active material layer 44 are in contact with the separator 20 at one surface and the other surface, respectively. An electrolyte is contained in each of the positive electrode active material layer 34, the negative electrode active material layer 44, and the separator 20. In FIG. 1, for example, aluminum leads 52 and 54 are connected to an end portion of the positive electrode current collector 32 and an end portion of the negative electrode current collector 42, respectively.

As described above, the lithium ion secondary battery of the present embodiment more preferably contains the ion trapping agent of the present embodiment in at least one of an electrolyte or a separator.

In general, inclusion of impurities in an electrolyte may cause a short circuit. During charging and discharging, particularly impurity metal ions, for example, pass through a separator to move bidirectionally between a positive electrode and a negative electrode. Therefore, when an ion trapping agent is included in at least one of the electrolyte or the separator, unnecessary metal ions can be trapped more effectively.

(2) Positive Electrode

As described above, a positive electrode as a component of a lithium ion secondary battery usually has a positive electrode active material layer on at least a part of the surface of a positive electrode current collector. As the positive electrode current collector, a strip of a metal or an alloy such as aluminum, titanium, copper, nickel, or stainless steel in a form of foil, mesh, or the like can be used.

Examples of the positive electrode material used for the positive electrode active material layer include a metal compound, a metal oxide, a metal sulfide, and a conductive polymer material each capable of doping or intercalating lithium ions. Specifically, for example, lithium cobalt oxide ($LiCoO_2$), lithium nickel oxide ($LiNiO_2$), lithium manganate ($LiMnO_2$), and a composite material thereof, and a conductive polymer such as polyacetylene, polyaniline, polypyrrole, polythiophene, and polyacene can be used singly or in combination of two or more thereof.

When preparing a positive electrode that contains an ion trapping agent, a method of preparing a positive electrode material-containing slurry by using a positive electrode material, an ion trapping agent, and a binder together with an organic solvent by means of a dispersing device such as a stirrer, and applying the slurry onto a current collector material to form a positive electrode active material layer can be applied. A method of forming a paste of a positive electrode material-containing slurry into a form of sheet, pellet, or the like, and integrating it with a current collector material can be also applied.

A concentration of anion trapping agent in the positive electrode material-containing slurry can be appropriately selected, and is preferably from 0.01 to 5.0% by mass, and more preferably from 0.1 to 2.0% by mass.

Examples of the binder include a polymer compound such as styrene-butadiene copolymer, (meth)acrylic copolymer, polyvinylidene fluoride, polyethylene oxide, polyepichlorohydrin, polyphosphazene, polyimide, or polyamideimide.

A content ratio of the binder in the positive electrode active material layer is preferably from 0.5 to 20 parts by mass, and more preferably from 1 to 10 parts by mass, with respect to 100 parts by mass of a total of the positive electrode material, the ion trapping agent, and the binder. When the content ratio of a binder is in the range of from 0.5 to 20 parts by mass, the binder can be sufficiently adhered to a current collector material and an increase in the electrode resistance can also be suppressed.

Examples of a method of applying the positive electrode material-containing slurry onto a current collector material include a metal mask printing method, an electrostatic coating method, a dip coating method, a spray coating method, a roll coating method, a doctor blade method, a gravure coating method, and a screen printing method.

(3) Negative Electrode

As described above, a negative electrode as a component of a lithium ion secondary battery usually has a negative electrode active material layer on at least a part of the surface of a negative electrode current collector. The constituent material of the negative electrode current collector may be the same as the constituent material of the positive electrode current collector, and may be composed of a porous material such as foam metal or carbon paper.

Examples of the negative electrode material used for the negative electrode active material layer include a carbon material, a metal compound, a metal oxide, a metal sulfide, and a conductive polymer material each capable of doping or intercalating lithium ions. Specifically, natural graphite, artificial graphite, silicon, lithium titanate and the like can be used singly or in combination of two or more thereof.

When preparing a negative electrode containing an ion trapping agent, a method of preparing a negative electrode material-containing slurry by kneading a negative electrode material, an ion trapping agent, and a binder together with an organic solvent by means of a dispersing device such as a stirrer, a ball mill, a super sand mill, or a pressure kneader, and applying the slurry onto a current collector material to form a negative electrode active material layer can be applied. A method of forming a paste of a negative electrode material-containing slurry into a form of sheet, pellet, or the like, and integrating it with a current collector material can also be applied.

As an ion trapping agent and a binder that are used in an electrode material-containing slurry, the same materials as those used for the above-described materials for producing a positive electrode can be used, respectively, and the contents thereof can also be the same, respectively.

When the negative electrode material-containing slurry is applied onto a current collector material, a known method can be applied as in the case of the positive electrode.

(4) Electrolyte

The electrolyte used in the lithium ion secondary battery of the present embodiment is not particularly limited, and those known can be used. For example, a non-aqueous lithium ion secondary battery can be produced by using an electrolyte in which an electrolyte is dissolved in an organic solvent.

Examples of the electrolyte include a lithium salt such as $LiPF_2$, $LiClO_4$, $LiBF_4$, $LiCF_4$, $LiAsF_6$, $LiSbF_6$, $LiAlO_2$, $LiAlCl_4$, $LiN(CF_3SO_2)_2$, $LiN(C_2F_5SO_2)_2$, $LiC(CF_3SO_2)_3$, LiCl, or LiI that generates an anion which is difficult to solvate.

A concentration of the electrolyte is preferably from 0.3 to 5 mol, more preferably from 0.5 to 3 mol, and particularly preferably from 0.8 to 1.5 mol, with respect to 1 L of the electrolyte.

Examples of the organic solvent include an aprotic solvent such as: a carbonate such as propylene carbonate, ethylene carbonate, diethyl carbonate, dimethyl carbonate, butylene carbonate, vinylene carbonate, fluoroethylene carbonate, ethyl methyl carbonate, methylpropyl carbonate, butylmethyl carbonate, ethylpropyl carbonate, butylethyl carbonate, or dipropyl carbonate; a lactone such as γ-butyrolactone; an ester such as methyl acetate or ethyl acetate; a chain ether such as 1,2-dimethoxyethane, dimethyl ether, or diethyl ether; a cyclic ether such as tetrahydrofuran, 2-methyltetrahydrofuran, dioxolane, or 4-methyldioxolane; a ketone such as cyclopentanone; a sulfolane such as sulfolane, 3-methylsulfolane, or 2,4-dimethylsulfolane; a sulfoxide such as dimethyl sulfoxide; a nitrile such as acetonitrile, propionitrile, or benzonitrile; an amide such as N,N-dimethylformamide or N,N-dimethylacetamide; a urethane such as 3-methyl-1,3-oxazolidin-2-one; or a polyoxyalkylene glycol such as diethylene glycol. These organic solvents may be used singly or in combination of two or more thereof.

The electrolyte of the present embodiment contains at least one ion trapping agent described above.

From the viewpoint of suppressing occurrence of a short circuit and internal resistance, a content ratio of the ion trapping agent in the electrolyte of the present embodiment is preferably from 0.01 to 50% by mass, more preferably from 0.1 to 30% by mass, and further preferably from 0.5 to 10% by mass.

Examples of a method of containing an ion trapping agent in an electrolyte include a method of adding an ion trapping agent in a state of solid or dispersion liquid to a mixed solution of an electrolyte and an organic solvent, and mixing the resultant. Among these, a method of adding an ion trapping agent in a state of solid is preferable.

When an electrolyte is produced by using an ion trapping agent in a state of dispersion liquid, a solvent of the dispersion liquid is not particularly limited. Among them, the solvent of the dispersion liquid is preferably the same as the organic solvent that constitutes the electrolyte. A concentration of the ion trapping agent in the dispersion liquid can be appropriately selected, and is preferably from 0.01 to 50% by mass, and more preferably from 1 to 20% by mass.

(5) Separator

A separator plays a role of separating a positive electrode and a negative electrode so that no short circuit occurs between the electrodes, and when an excessive current flows through a battery, the separator melts due to heat generation and pores are closed, thereby interrupting current and ensuring safety.

The separator is preferably composed of a base material having a porous portion (hereinafter referred to as "porous base material"), and the structure thereof is not particularly limited. The porous base material is not particularly limited, as long as the material has a large number of pores or voids inside thereof and has a porous structure in which the pores are connected to each other. For example, a porous film, a non-woven fabric, a paper sheet, or a sheet having a three-dimensional network structure can be used. Among them, a microporous film is preferable from the viewpoint of handleability and strength. As the material that constitutes a porous base material, either an organic material or an inorganic material can be used, and from the viewpoint of obtaining shutdown characteristics, a thermoplastic resin such as a polyolefin resin is preferable.

Examples of the polyolefin resin include polyethylene, polypropylene, and polymethylpentene. Among these, a polymer containing 90% by mass or more of ethylene unit is preferable from the viewpoint of obtaining favorable shutdown characteristics. The polyethylene may be any of a low density polyethylene, a high density polyethylene, and an ultra high molecular weight polyethylene. In particular, at least one selected from a high density polyethylene or an ultra high molecular weight polyethylene is preferably contained, and polyethylene that contains a mixture of a high density polyethylene and an ultra high molecular weight polyethylene is more preferable. Such polyethylene is excellent in strength and moldability.

The polyethylene preferably has a weight average molecular weight of from 100,000 to 10,000,000, and a polyethylene composition that includes at least 1% by mass or more of an ultra high molecular weight polyethylene having a weight average molecular weight of 1,000,000 or more is particularly preferable.

The porous base material may contain polyethylene and another polyolefin such as polypropylene or polymethylpentene, and may be a layered body of two or more layers composed of a polyethylene porous film and a polypropylene porous film.

The separator of the present embodiment includes at least one ion trapping agent described above.

In the present embodiment, a preferable separator includes an ion trapping agent and a portion that is composed of a porous base material.

A content of the ion trapping agent in the separator is preferably from 0.01 to 50 g/m$^2$, and more preferably from 0.1 to 20 g/m$^2$, from the viewpoint of suppressing occurrence of a short circuit.

A preferred structure of the separator of the present embodiment has a layer that contains an ion trapping agent at any site from a side of one surface to a side of the other surface, as exemplified below.

(S1) Separator including an ion trapping agent 60 at a surface layer at one side of a porous base material 15

Figure 2:
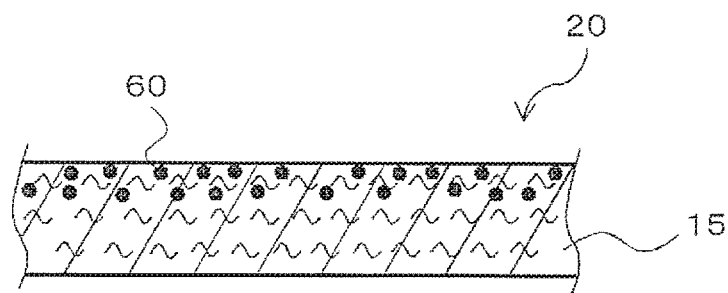
FIG. 2 is a schematic diagram showing a sectional structure of a separator of an aspect (S1).

FIG. 2 shows a separator of this aspect, but the separator is not limited thereto, and the ion trapping agent 60 may be present not only inside the porous base material 15 but also on the surface thereof.

(S2) Separator including an ion trapping agent 60 at surface layers at both sides of a porous base material 15

Figure 3:
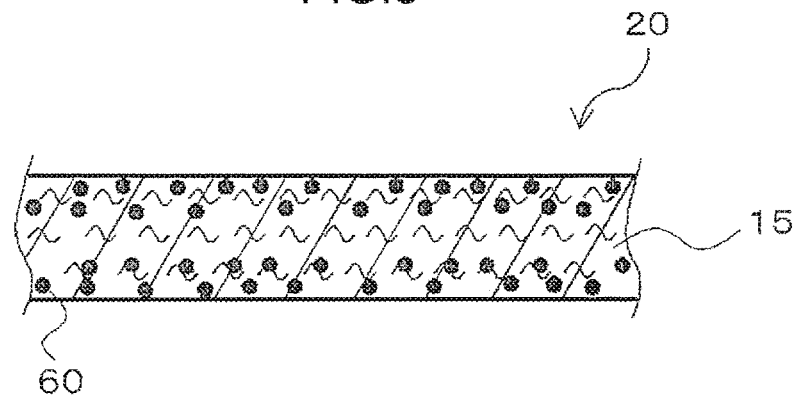
FIG. 3 is a schematic diagram showing a sectional structure of a separator of an aspect (S2).

FIG. 3 shows a separator of this aspect, but the separator is not limited thereto, and the ion trapping agent 60 may be present not only inside the porous base material 15 but also on the surface thereof.

(S3) Separator including an ion trapping agent 60 entirely from one surface to the other surface of a porous base material 15

Figure 4:
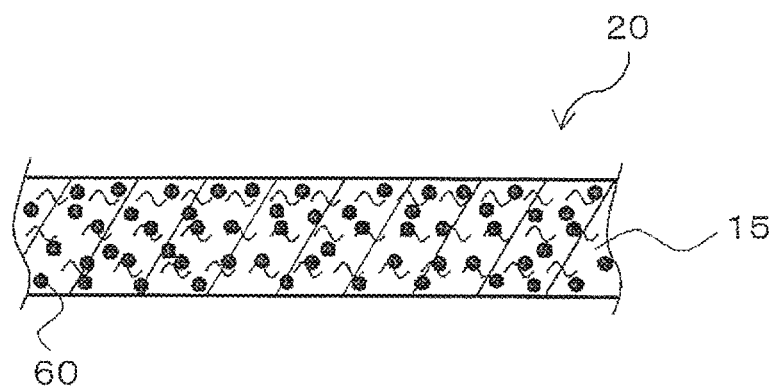
FIG. 4 is a schematic diagram showing a sectional structure of a separator of an aspect (S3).

FIG. 4 shows a separator of this aspect, but the separator is not limited thereto, and the ion trapping agent 60 may be present not only inside the porous base material 15 but also on the surface thereof.

(S4) Separator including an ion trapping agent 60 in layers inside a porous base material 15

Figure 5:
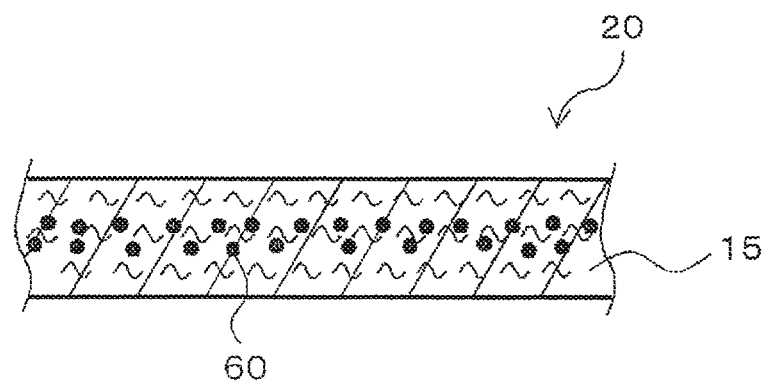
FIG. 5 is a schematic diagram showing a sectional structure of a separator of an aspect (S4).

FIG. 5 shows a separator of this aspect, but the separator is not limited thereto, and the number of layers each containing an ion trapping agent inside the porous base material 15 may be plural.

In the case of a separator 20 of the aspect (S1) shown in FIG. 2, in a lithium ion secondary battery, the side at which the ion trapping agent 60 is contained may be positioned at either a surface at the side of the positive electrode or a surface at the side of the negative electrode. Considering that metal ions are eluted from the positive electrode, or that metal ions are reduced and metals are deposited on the negative electrode, positioning at a surface at the side of the positive electrode is preferable, and the separator 20 of the aspect (S2) shown in FIG. 3 in which the ion trapping agent 60 is positioned at surface layers at both sides is also preferable.

Each of the separators of the above-described aspects (S1) and (S2) can be produced by: a method including, in the order mentioned, a process of applying a dispersion liquid that contains an ion trapping agent onto either a surface at one side or surfaces at both sides of a porous base material, and a process of drying the coating film to form a layer that contains the ion trapping agent; or a method including, in the order mentioned, a process of immersing either a surface at one side or surfaces at both sides of a porous base material in a dispersion liquid that contains an ion trapping agent, and a process of drying the coating film to form a layer that contains the ion trapping agent.

The separator of the above-described aspect (S3) can be produced by a method including, in the order mentioned, a process of immersing a porous base material in a dispersion liquid that contains an ion trapping agent, and a process of drying the porous base material provided with the coating liquid.

The separator of the above-described aspect (S4) can be produced by: a method including, in the order mentioned, a process of applying a dispersion liquid that contains an ion trapping agent onto a surface at one side of a porous base material, a process of drying the coating film to form a layer that contains the ion trapping agent, and a process of joining another porous base material to the layer that contains the ion trapping agent; or a method including, in the order mentioned, a process of immersing a surface at one side of a porous base material in a dispersion liquid that contains an ion trapping agent, a process of drying the coating film to form a layer that contains the ion trapping agent, and a process of joining another porous base material to the layer that contains the ion trapping agent.

The solvent of a dispersion liquid containing the ion trapping agent is not particularly limited. Examples thereof include water, N-methyl-2-pyrrolidone, and an alcohol such as methanol, ethanol, or 1-propanol.

A concentration of the ion trapping agent in the dispersion liquid can be appropriately selected, and is preferably from 0.01 to 50% by mass, and more preferably from 1 to 20% by mass.

The dispersion liquid may further contain a binder. When the dispersion liquid containing an ion trapping agent contains a binder, the ion trapping agent is reliably immobilized on the porous base material. As a result, unnecessary metal ions can be efficiently trapped without the ion trapping agent falling off during production of a battery.

The binder is not particularly limited, and a binder that is capable of favorably adhering the lithium ion-containing layered phosphate compound and the porous base material, that is electrochemically stable, and that is stable in an electrolyte is preferable. Examples of such a binder include ethylene-vinyl acetate copolymer, ethylene-ethyl acrylate copolymer, ethylene-acrylic acid copolymer, a fluorine resin such as polyvinylidene fluoride, vinylidene fluoride-hexafluoropropylene copolymer, or vinylidene fluoride-trichloroethylene copolymer, fluorine rubber, styrene-butadiene rubber, nitrile butadiene rubber, polybutadiene rubber, polyacrylonitrile, polyacrylic acid, carboxymethyl cellulose, hydroxyethyl cellulose, polyvinyl alcohol, cyanoethyl polyvinyl alcohol, polyvinyl butyral, polyvinyl pyrrolidone, poly N-vinyl acetamide, polyether, polyamide, polyimide, polyamideimide, polyaramid, a crosslinked acrylic resin, polyurethane, and an epoxy resin. In the present embodiment, polyvinyl alcohol, polyvinylidene fluoride, styrene-butadiene rubber, polyacrylic acid, carboxymethyl cellulose, or the like is preferable. From the viewpoint of battery constituent materials, the binder is preferably the same as the binder that is used in the positive electrode active material layer or the negative electrode active material layer.

An usage amount (solid content) of the binder is preferably from 0.1 to 20 parts by mass, and more preferably from 0.3 to 10 parts by mass, with respect to 100 parts by mass of a total amount of the ion trapping agent and the binder. When the usage amount of a binder is in the range of from 0.1 to 20 parts by mass, the ion trapping agent is reliably immobilized on the porous base material, and the effect is maintained. Further, the metal adsorption efficiency per mass can be improved.

The method of applying the dispersion liquid onto the porous base material is not particularly limited. A known method such as a metal mask printing method, an electrostatic coating method, a dip coating method, a spray coating method, a roll coating method, a reverse roll coating method, a transfer roll coating method, a kiss coating method, a knife coating method, a rod coating method, a squeeze coating method, a cast coating method, a die coating method, a doctor blade method, a gravure coating method, or a screen printing method can be applied.

Although not shown in the drawings, the separator of the present embodiment may be, for example, composed of a layered body in which an independent layer containing an ion trapping agent is formed at a surface at one side or surfaces at both sides of a porous base material, or composed of a layered body that includes an independent layer containing an ion trapping agent between two porous base materials.

In the present embodiment, in the separator of any of the above-described aspects, a thickness of the ion trapping agent-containing layer is as follows. A lower limit of the thickness is preferably 0.5 µm, more preferably 2 µm, still more preferably 3 µm, and particularly preferably 4 µm, from the viewpoint of ion trapping property. From the viewpoint of the permeability of the electrolyte, higher capacity of the battery, or the like, an upper limit of the thickness is preferably 90 µm, more preferably 50 µm, still more preferably 30 µm, and particularly preferably 10 µm.

The number of separators included in the lithium ion secondary battery of the present embodiment is not particularly limited, and can be appropriately selected depending on the structure of a battery.

Preferable aspects of the lithium ion secondary battery of the present embodiment are exemplified below.

(L1) A battery in which only a positive electrode contains the ion trapping agent of the present embodiment (L2) A battery in which only an electrolyte contains the ion trapping agent of the present embodiment (L3) A battery in which only a separator contains the ion trapping agent of the present embodiment (battery including the separator of the present embodiment)

(L4) A battery in which a positive electrode and an electrolyte each contain the ion trapping agent of the present embodiment (L5) A battery in which a positive electrode and a separator each contain the ion trapping agent of the present embodiment (battery including the separator of the present embodiment)

(L6) A battery in which an electrolyte and a separator each contain the ion trapping agent of the present embodiment (battery including the separator of the present embodiment)

(L7) A battery in which a positive electrode, an electrolyte, and a separator each contain the ion trapping agent of the present embodiment (battery including the separator of the present embodiment)

Of these, the aspects (L3), (L5), and (L6) are preferable. In the aspects (L3), (L5), (L6), and (L7), it is particularly preferable that the battery includes a separator in which an ion trapping agent-containing layer is positioned at least at a side of the positive electrode. In the above-described aspects (L4), (L5), (L6), and (L7), the ion trapping agents contained in respective portions may be the same as or different from each other.

By using the electrolyte of the present embodiment, a lithium ion secondary battery that includes a positive electrode and a negative electrode and does not include a separator can be obtained. In this case, the positive electrode and the negative electrode are configured such that they do not come into direct contact with each other, and a separator is not required.

EXAMPLES

Hereinafter, the disclosure of the specification will be specifically described by way of Examples. The present embodiment is, however, not limited to the following Examples. In the following Examples, "%" means "% by mass".

<Evaluation Method>

(1) Moisture Content

An ion trapping agent was vacuum dried at 150° C. for 20 hours, and then the moisture content was measured by the Karl Fisher method using Karl Fischer moisture meter MKC-710 and vaporizer ADP-611 manufactured by Kyoto Electronics Manufacturing Co., Ltd. in accordance with JIS K0113 "Potential Difference/Electric Current/Electric Quantity/Karl Fischer Titration General Rule".

(2) Metal Ion Trapping Capacity in Electrolyte

Assuming application to a lithium ion secondary battery, the metal ion trapping capacity in a model electrolyte was evaluated. A specific evaluation method is as follows.

[Measurement of Cobalt Ion Trapping Capacity]

As the test solution, a cobalt tetrafluoroborate hexahydrate solution was prepared by dissolving, at a concentration of 0.05 mol/L, $Co(BF_4)_2.6H_2O$ in a mixed solvent of ethylene carbonate (EC) and ethyl methyl carbonate (EMC) (volume ratio EC:EMC=3:7). 20 mL of this solution was put into a plastic bottle, and 0.4 g of an ion trapping agent was added thereto. Next, this solution was stirred at 25° C. for about 1 minute and then allowed to stand at 40° C. After standing for about 50 hours, the concentration of $Co^{2+}$ ions was measured with an ICP emission spectrometer "iCA7600 DUO" (model name) manufactured by Thermo Fisher Scientific K.K. For the ion trapping capacity, the ion trapping capacity (meq/g) per 1 g of the ion trapping agent was determined from the difference in metal ion concentration before and after the ion trapping agent was added. The unit of the obtained value is meq/g.

[Measurement of Manganese Ion Trapping Capacity]

The $Mn^{2+}$ ion trapping capacity (meq/g) was determined by performing the same operation and analysis as above, except that a manganese perchlorate hexahydrate solution in which $Mn(ClO_4)_2.6H_2O$ was dissolved, at a concentration of 0.05 mol/L, in a mixed solvent of ethylene carbonate (EC) and ethyl methyl carbonate (EMC) (volume ratio EC:EMC=3:7) was used as the test solution.

(3) Evaluation of Metal Ion Trapping Ability in Model Electrolyte

Assuming application to a lithium ion secondary battery, the metal ion trapping ability in a model electrolyte was evaluated.

[Cobalt Ion Trapping Ability]

10 ppm of $Co(BF_4)_2.6H_2O$ was dissolved in a lithium tetrafluoroborate solution (electrolyte for lithium ion battery manufactured by Kishida Chemical Co., Ltd., trade name LBG-00860) obtained by dissolving, at a concentration of 1 mol/L, $LiBF_4$ in a mixed solvent of ethylene carbonate (EC) and ethyl methyl carbonate (EMC) (volume ratio EC:EMC=3:7), to prepare a model electrolyte.

Next, 30 mL of this model electrolyte was put into a plastic bottle, 0.03 g of an ion trapping agent was added thereto, and the container was sealed. The electrolyte was stirred at 25° C. for about 1 minute and then allowed to stand at 50° C. Then, after about 16 hours, the concentration of $Co^{2+}$ ions was measured by an ICP emission spectrometer "iCA7600 DUO" (model name) manufactured by Thermo Fisher Scientific K.K.

[Manganese Ion Trapping Ability]

10 ppm of $Mn(ClO_4)_2.6H_2O$ was dissolved in a lithium tetrafluoroborate solution (electrolyte for lithium ion battery manufactured by Kishida Chemical Co., Ltd., trade name LBG-00860) obtained by dissolving, at a concentration of 1 mol/L, $LiBF_4$ in a mixed solvent of ethylene carbonate (EC) and ethyl methyl carbonate (EMC) (volume ratio EC:EMC=3:7), to prepare a model electrolyte.

Next, 30 mL of this model electrolyte was put into a plastic bottle, 0.03 g of an ion trapping agent was added thereto, and the container was sealed. The electrolyte was stirred at 25° C. for about 1 minute and then allowed to stand at 50° C. Then, after about 16 hours, the concentration of $Mn^{2+}$ ions was measured by an ICP emission spectrometer "iCA7600 DUO" (model name) manufactured by Thermo Fisher Scientific K.K.

(4) BET Specific Surface Area

The BET specific surface area of the ion trapping agent was measured in accordance with JIS R1626 "Measuring methods for the specific surface area of fine ceramic powders by gas adsorption using the BET method" using "AUTOSORB-1" (model name) manufactured by Quantachrome Corporation.

(5) Powder X-Ray Diffraction

For powder X-ray diffraction (hereinafter abbreviated as "XRD") measurement, "D8 ADVANCE" manufactured by BRUKER JAPAN K. K. was used. An X-ray diffraction pattern was obtained using a Cu-encapsulated X-ray source and CuKα generated at an applied voltage of 40 kv and a current value of 40 mA. Detailed measurement conditions are shown in Table 1.

TABLE 1

| | |
|---|---|
| X-ray source | Encapsulated X-ray source (Cu source) 0.4 * 12 mm² Long Fine Focus |
| Rating | 2.2 kW |

TABLE 1-continued

| | |
|---|---|
| Usage Output | 40 kV-40 mA (1.6 kW) |
| Goniometer radius | 280 mm |
| Sample stage | FlipStick_Twin_Twin-XE |
| 2θ range | 5° to 55° |
| Step width | 0.02° |
| Step time | 0.05 sec/step |
| Incident side solar slit | 2.5° |
| Anti-scatter slit | 10.5 mm |
| Curvature | 1 |
| Detector | LYNXEYE_XE |
| Detector slit width | 5.758 mm |
| Detector window width | 2.9° |

1. Production of Ion Trapping Agent

<Production Example 1> Synthesis of α-Zirconium Phosphate

After dissolving 0.272 mol of zirconium oxychloride octahydrate (Wako Pure Chemical Industries, Ltd.) in 850 mL of deionized water, 0.788 mol of oxalic acid dihydrate (manufactured by Wako Pure Chemical Industries, Ltd.) was dissolved. While stirring this solution, 0.57 mol of phosphoric acid was added. This was stirred and refluxed for 8 hours. After cooling, the obtained precipitate was washed with water well and then dried at 150° C. to obtain zirconium phosphate. This zirconium phosphate was analyzed and confirmed to be α-zirconium phosphate (1) Zr$(HPO_4)_2 \cdot H_2O$ containing 6.64 mmol of $H^+$ ions per 1 g, accordingly, having a theoretical exchange capacity of the ion exchange group of 6.64 meq/g.

The median diameter of α-zirconium phosphate (laser diffraction particle size analyzer "LA-950" (model name) manufactured by Horiba Ltd.) was measured and found to be 0.9 μm.

The composition of zirconium phosphate was estimated by adding 0.1 g of the resulting zirconium phosphate to 20 mL of concentrated nitric acid solution diluted 2-fold with pure water and heating, dropping 0.5 mL of hydrofluoric acid to dissolve, quantitatively analyzing each component, and determining the content ratio of each component. Table 2 shows the ratio of Li ion to phosphate group $PO_4$ in the estimated composition. Compositions other than zirconium phosphate shown in the following Examples and Comparative Examples were all determined by the same method, respectively.

<Production Example 2> Synthesis of Calcined Li-Substituted α-Zirconium Phosphate (1)

70 g of α-zirconium phosphate (1) obtained in Production Example 1 was added to 7,000 mL of 0.1N (mol/L) aqueous LiOH solution while stirring. This was further stirred for 8 hours, then filtered through a filter and washed with water until the conductivity of the filtrate became 500 μS/cm or less. After washing, the resultant was vacuum-dried at 150° C. for 20 hours, and then calcined at 400° C. for 4 hours to obtain a calcined Li-substituted α-zirconium phosphate (1). The median diameter was 0.9 μm. The calcined Li-substituted α-zirconium phosphate (1) was $ZrO_2 \cdot P_2O_5 \cdot Li_2O$ having an introduction amount of Li ions of 6.78 meq/g. The mass ratio ($Li/PO_4$) of lithium atoms to phosphate groups $PO_4$ in this composition is 0.073. (Example 1)

In all Examples, the mass ratio ($Li/PO_4$) of lithium atoms to phosphate groups $PO_4$ contained in the Li-substituted layered phosphate compound was calculated on the assumption that $PO_4$ was contained in the number of P atoms contained in the molecule.

<Production Example 3> Synthesis of Calcined Li-Substituted α-Zirconium Phosphate (2)

A calcined Li-substituted α-zirconium phosphate (2) was obtained in the same manner as in Production Example 2 except that the Li-substituted α-zirconium phosphate (2) was calcined at 400° C. for 4 hours. The median diameter was 0.9 μm. The composition of the calcined Li-substituted α-zirconium phosphate (2) was $ZrO_2 \cdot 0.75P_2O_5 \cdot 1.5Li_2O$ having an introduction amount of Li ions of 10.93 meq/g. The mass ratio ($Li/PO_4$) of lithium atoms to phosphoric acid groups $PO_4$ in this composition is 0.147. (Example 2)

<Production Example 4> Synthesis of Calcined Li-Substituted α-Zirconium Phosphate (3)

A calcined Li-substituted α-zirconium phosphate (3) was obtained in the same manner as in Production Example 2 except that the Li-substituted α-zirconium phosphate (3) was calcined at 400° C. for 4 hours. The median diameter was 0.9 μm. The composition of the calcined Li-substituted α-zirconium phosphate (3) was $ZrO_2 \cdot 0.6P_2O_5 \cdot 1.8Li_2O$ having an introduction amount of Li ions of 13.73 meq/g. The mass ratio ($Li/PO_4$) of lithium atoms to phosphoric acid groups $PO_4$ in this composition is 0.22. (Example 3)

<Production Example 5> Synthesis of Calcined Li-Substituted α-Zirconium Phosphate (4)

20 g of α-zirconium phosphate obtained in Production Example 1 was mixed with 5.87 g of LiOH in a mortar. 25 g of pure water was added thereto and mixed well. The mixture was dried at 150° C. for 12 hours and further calcined at 400° C. for 4 hours to obtain a calcined Li-substituted α-zirconium phosphate (4). The composition of the calcined Li-substituted α-zirconium phosphate (4) was $ZrO_2 \cdot P_2O_5 \cdot Li_2O$ having an introduction amount of Li ions of 6.78 meq/g. The mass ratio ($Li/PO_4$) of lithium atoms to phosphoric acid groups $PO_4$ in this composition is 0.073. (Example 4)

<Production Example 6> Synthesis of Calcined Li-Substituted α-Zirconium Phosphate (5)

20 g of α-zirconium phosphate obtained in Production Example 1 was mixed with 8.39 g of LiOH in a mortar. 25 g of pure water was added thereto and mixed well. The mixture was dried at 150° C. for 12 hours and further calcined at 400° C. for 4 hours to obtain a calcined Li-substituted α-zirconium phosphate (5). The composition of the calcined Li-substituted α-zirconium phosphate (5) was $ZrO_2 \cdot P_2O_5 \cdot 1.4Li_2O$ having an introduction amount of Li ions of 9.12 meq/g. The mass ratio ($Li/PO_4$) of lithium atoms to phosphoric acid groups $PO_4$ in this composition is 0.104. (Example 5)

<Production Example 7> Synthesis of Calcined Li-Substituted α-Zirconium Phosphate (6)

20 g of α-zirconium phosphate obtained in Production Example 1 was mixed with 12.59 g of LiOH in a mortar. 25 g of pure water was added thereto and mixed well. The mixture was dried at 150° C. for 12 hours and further calcined at 400° C. for 4 hours to obtain a calcined Li-substituted α-zirconium phosphate (6). The composition of the calcined Li-substituted α-zirconium phosphate (6) was $ZrO_2 \cdot P_2O_5 \cdot 2.1Li_2O$ having an introduction amount of Li ions of 12.80 meq/g. The mass ratio ($Li/PO_4$) of lithium atoms to phosphoric acid groups $PO_4$ in this composition is 0.156. (Example 6)

<Production Example 8> Synthesis of Calcined Li-Substituted α-Zirconium Phosphate (11)

20 g of α-zirconium phosphate obtained in Production Example 1 was mixed with 16.78 g of LiOH in a mortar. 25 g of pure water was added thereto and mixed well. The mixture was dried at 150° C. for 12 hours and further calcined at 400° C. for 4 hours to obtain a calcined Li-substituted α-zirconium phosphate (11). The composition of the calcined Li-substituted α-zirconium phosphate (11) was $ZrO_2 \cdot P_2O_5 \cdot 2.8Li_2O$ having an introduction amount of Li ions of 18.24 meq/g. The mass ratio ($Li/PO_4$) of lithium ions to phosphoric acid groups $PO_4$ in this composition is 0.22. (Example 7)

<Production Example 9> Synthesis of Calcined Li-Substituted α-Zirconium Phosphate (12)

20 g of α-zirconium phosphate obtained in Production Example 1 was mixed with 20.98 g of LiOH in a mortar. 25 g of pure water was added thereto and mixed well. The mixture was dried at 150° C. for 12 hours and further calcined at 400° C. for 4 hours to obtain a calcined Li-substituted α-zirconium phosphate (12). The composition of the calcined Li-substituted α-zirconium phosphate (12) was $ZrO_2 \cdot P_2O_5 \cdot 3.5Li_2O$ having an introduction amount of Li ions of 21.94 meq/g. The mass ratio ($Li/PO_4$) of lithium ions to phosphoric acid groups $PO_4$ in this composition is 0.27. (Example 8)

<Production Example 10> Synthesis of Calcined Li-Substituted α-Zirconium Phosphate (13)

20 g of α-zirconium phosphate obtained in Production Example 1 was mixed with 25.18 g of LiOH in a mortar. 25 g of pure water was added thereto and mixed well. The mixture was dried at 150° C. for 12 hours and further calcined at 400° C. for 4 hours to obtain a calcined Li-substituted α-zirconium phosphate (13). The composition of the calcined Li-substituted α-zirconium phosphate (13) was $ZrO_2 \cdot P_2O_5 \cdot 4.2Li_2O$ having an introduction amount of Li ions of 25.18 meq/g. The mass ratio ($Li/PO_4$) of lithium ions to phosphoric acid groups $PO_4$ in this composition is 0.33. (Example 9)

<Production Example 11> Synthesis of Fine Particle α-Zirconium Phosphate 1,160 mL of deionized water and 173.4 g of 35% hydrochloric acid were placed in a 2 L-flat-bottomed flask, 288.4 g of a 20% aqueous solution of zirconium oxychloride octahydrate was added thereto, and then 119.2 g of oxalic acid dihydrate was dissolved therein. While stirring this solution well, 134.4 g of 75% phosphoric acid was added. This was heated to 98° C. in 2 hours, and stirred and refluxed for 12 hours. After cooling, the obtained precipitate was washed with water well and then dried at 105° C. to obtain zirconium phosphate. This was crushed with a rotor speed mill (16,000 rpm, sieve 80 μm). The obtained zirconium phosphate was measured and confirmed to be α-zirconium phosphate (2).

The median diameter of α-zirconium phosphate (laser diffraction particle size analyzer "LA-950" (model name) manufactured by Horiba Ltd.) was measured and found to be 0.3 μm.

<Production Example 12> Synthesis of Calcined Li-Substituted α-Zirconium Phosphate (7)

70 g of α-zirconium phosphate (2) obtained in Production Example 11 was added to 7,000 mL of 0.1N aqueous LiOH solution while stirring. This was stirred for 8 hours, then filtered through a filter and washed with water until the conductivity of the filtrate became 500 μS/cm or less. This was vacuum-dried at 150° C. for 20 hours to obtain a lithium ion-substituted α-zirconium phosphate (4).

This lithium ion-substituted α-zirconium phosphate (4) was calcined at 400° C. for 4 hours to obtain a calcined Li-substituted α-zirconium phosphate (7). The median diameter was 0.3 μm. The composition of the calcined Li-substituted α-zirconium phosphate (7) was $ZrO_2 \cdot 0.8P_2O_5 \cdot 0.8Li_2O$. The mass ratio ($Li/PO_4$) of lithium atoms to phosphate groups $PO_4$ in this composition is 0.073. (Example 10)

<Production Example 13> Synthesis of Calcined Li-Substituted α-Zirconium Phosphate (8)

70 g of α-zirconium phosphate (2) obtained in Production Example 11 was added to 7,000 mL of 0.15N aqueous LiOH solution while stirring. This was stirred for 8 hours, then filtered through a filter and washed with water until the conductivity of the filtrate became 500 μS/cm or less. This was vacuum-dried at 150° C. for 20 hours to obtain a lithium ion-substituted α-zirconium phosphate (5).

This lithium ion-substituted α-zirconium phosphate (5) was calcined at 400° C. for 4 hours to obtain a calcined Li-substituted α-zirconium phosphate (8). The median diameter was 0.3 μm. The composition of the calcined Li-substituted α-zirconium phosphate (8) was $ZrO_2 \cdot P_2O_5 \cdot 1.4Li_2O$ having an introduction amount of Li ions of 9.12 meq/g. The mass ratio ($Li/PO_4$) of lithium atoms to phosphate groups $PO_4$ in this composition is 0.136. (Example 11)

<Production Example 14> Synthesis of Calcined Li-Substituted α-Zirconium Phosphate (9)

20 g of α-zirconium phosphate (2) obtained in Production Example 11 was mixed with 5.87 g of LiOH in a mortar. 25 g of pure water was added thereto and mixed well. The mixture was dried at 150° C. for 12 hours and further calcined at 400° C. for 4 hours to obtain a calcined Li-substituted α-zirconium phosphate (9). The composition of the calcined Li-substituted α-zirconium phosphate (9) was $ZrO_2 \cdot P_2O_5 \cdot Li_2O$ having an introduction amount of Li ions of 6.78 meq/g. The mass ratio ($Li/PO_4$) of lithium atoms to phosphoric acid groups $PO_4$ in this composition is 0.073. (Example 12)

<Production Example 15> Synthesis of Calcined Li-Substituted α-Zirconium Phosphate (10)

20 g of α-zirconium phosphate (2) obtained in Production Example 11 was mixed with 8.39 g of LiOH in a mortar. 25 g of pure water was added thereto and mixed well. The mixture was dried at 150° C. for 12 hours and further calcined at 400° C. for 4 hours to obtain a calcined Li-substituted α-zirconium phosphate (10). The composition of the calcined Li-substituted α-zirconium phosphate (10) was $ZrO_2 \cdot P_2O_5 \cdot 1.4Li_2O$ having an introduction amount of Li ions of 9.12 meq/g. The mass ratio (Li/PO$_4$) of lithium atoms to phosphoric acid groups PO$_4$ in this composition is 0.104. (Example 13)

<Production Example 16> Synthesis of α-Titanium Phosphate 405 g of 75% phosphoric acid was added to 400 mL of deionized water, and 137 g of titanyl sulfate (TiO$_2$ content; 33%) was added while stirring the solution. This was refluxed at 100° C. for 48 hours. After cooling, the obtained precipitate was washed with water well and then dried at 150° C. to obtain titanium phosphate. The obtained titanium phosphate was analyzed and confirmed to be α-titanium phosphate containing 7.76 mmol of $H^+$ ions per 1 g, accordingly, having an introduction amount of Li ions of 7.76 meq/g. The median diameter was 1.2 μm.

<Production Example 17> Synthesis of Calcined Li-Substituted α-Titanium Phosphate (1)

80.8 g of α-titanium phosphate obtained in Production Example 16 was added to 10,000 mL of 0.1N LiOH aqueous solution while stirring. This was stirred for 8 hours, washed with water and dried at 150° C. to obtain a Li-substituted α-titanium phosphate. This was further calcined at 400° C. for 4 hours to obtain a calcined Li-substituted a titanium phosphate (1). The median diameter was 1.2 μm. The composition of the calcined Li-substituted α-titanium phosphate (1) was $TiO_2 \cdot P_2O_5 \cdot Li_2O$ having an introduction amount of Li ions of 7.94 meq/g. The mass ratio (Li/PO$_4$) of lithium atoms to phosphate groups PO$_4$ in this composition is 0.073. (Example 14)

<Production Example 18> Synthesis of Calcined Li-Substituted α-Titanium Phosphate (2)

A Calcined Li-substituted α-titanium phosphate (2) was obtained in the same manner as in Production Example 16 except that the LiOH solution was changed to 0.15N. The composition of the calcined Li-substituted α-titanium phosphate (2) was $TiO_2 \cdot 0.75P_2O_5 \cdot 1.5Li_2O$ having an introduction amount of Li ions of 12.97 meq/g. The mass ratio (Li/PO$_4$) of lithium atoms to phosphoric acid groups PO$_4$ in this composition is 0.146. (Example 15)

<Production Example 19> Synthesis of Calcined Li-Substituted α-Titanium Phosphate (3)

16.2 g of α-titanium phosphate obtained in Production Example 16 was mixed with 6.88 g of LiOH in a mortar. 25 g of pure water was added thereto and mixed well. The mixture was dried at 150° C. for 12 hours and further calcined at 400° C. for 4 hours to obtain a calcined Li-substituted α-titanium phosphate (3). The composition of the calcined Li-substituted α-titanium phosphate (3) was $TiO_2 \cdot P_2O_5 \cdot Li_2O$ having an introduction amount of Li ions of 7.94 meq/g. The mass ratio (Li/PO$_4$) of lithium atoms to phosphoric acid groups PO$_4$ in this composition is 0.073.

(Example 16)

<Production Example 20> Synthesis of Calcined Li-Substituted α-Titanium Phosphate (4)

16.2 g of α-titanium phosphate obtained in Production Example 16 was mixed with 9.83 g of LiOH in a mortar. 25 g of pure water was added thereto and mixed well. The mixture was dried at 150° C. for 12 hours and further calcined at 400° C. for 4 hours to obtain a calcined Li-substituted α-titanium phosphate (4). The composition of the calcined Li-substituted α-titanium phosphate (4) was $TiO_2 \cdot P_2O_5 \cdot 1.4Li_2O$ having an introduction amount of Li ions of 10.62 meq/g. The mass ratio (Li/PO$_4$) of lithium atoms to phosphoric acid groups PO$_4$ in this composition is 0.104. (Example 17)

<Production Example 21> Synthesis of Low Crystalline α-Zirconium Phosphate After dissolving 0.272 mol of zirconium oxychloride octahydrate (manufactured by Wako Pure Chemical Industries, Ltd.) in 850 mL of deionized water, 0.788 mol of oxalic acid dihydrate (manufactured by Wako Pure Chemical Industries, Ltd.) was dissolved. While stirring this solution, 0.57 mol of phosphoric acid was added. This was stirred at room temperature for 8 hours. The precipitate was then washed with water well and then dried at 150° C. to obtain zirconium phosphate. This was crushed with a rotor speed mill (16,000 rpm, sieve 80 μm). The obtained zirconium phosphate was measured and confirmed to be α-zirconium phosphate (A).

The median diameter of α-zirconium phosphate (laser diffraction particle size analyzer "LA-950" (model name) manufactured by Horiba Ltd.) was measured and found to be 6.5 μm.

<Production Example 22> Synthesis of Calcined Li-Substituted α-Zirconium Phosphate (14)

20 g of α-zirconium phosphate A obtained in Production Example 21 was mixed with 16.78 g of LiOH in a mortar. 25 g of pure water was added thereto and mixed well. The mixture was dried at 150° C. for 12 hours and further calcined at 400° C. for 4 hours to obtain a calcined Li-substituted α-zirconium phosphate (14). The composition of the calcined Li-substituted α-zirconium phosphate (14) was $ZrO_2 \cdot P_2O_5 \cdot 2.8Li_2O$ having an introduction amount of Li ions of 18.24 meq/g. The mass ratio (Li/PO$_4$) of lithium ions to phosphoric acid groups PO$_4$ in this composition is 0.22. (Example 18)

<Production Example 23> Synthesis of Calcined Li-Substituted α-Zirconium Phosphate (15)

20 g of α-zirconium phosphate A obtained in Production Example 21 was mixed with 20.98 g of LiOH in a mortar. 25 g of pure water was added thereto and mixed well. The mixture was dried at 150° C. for 12 hours and further calcined at 400° C. for 4 hours to obtain a calcined Li-substituted α-zirconium phosphate (15). The composition of the calcined Li-substituted α-zirconium phosphate (15) was $ZrO_2 \cdot P_2O_5 \cdot 3.5Li_2O$ having an introduction amount of Li ions of 21.94 meq/g. The mass ratio (Li/PO$_4$) of lithium ions to phosphoric acid groups PO$_4$ in this composition is 0.27. (Example 19)

<Production Example 24> Synthesis of Calcined Li-Substituted α-Zirconium Phosphate (16)

20 g of α-zirconium phosphate A obtained in Production Example 21 was mixed with 25.18 g of LiOH in a mortar.

25 g of pure water was added thereto and mixed well. The mixture was dried at 150° C. for 12 hours and further calcined at 400° C. for 4 hours to obtain a calcined Li-substituted α-zirconium phosphate (16). The composition of the calcined Li-substituted α-zirconium phosphate (16) was $ZrO_2 \cdot P_2O_5 \cdot 4.2Li_2O$ having an introduction amount of Li ions of 25.18 meq/g. The mass ratio ($Li/PO_4$) of lithium ions to phosphoric acid groups $PO_4$ in this composition is 0.33. (Example 20)

<Production Example 25> Synthesis of Calcined Li-Substituted Zirconium Phosphate (C1)

70 g of α-zirconium phosphate (1) obtained in Production Example 1 was added to 2,800 mL of 0.1N LiOH aqueous solution while stirring. This was stirred for 8 hours, then filtered through a filter and washed with water until the conductivity of the filtrate became 500 μS/cm or less. This was vacuum-dried at 150° C. for 20 hours to obtain a lithium ion-substituted α-zirconium phosphate (6). This was calcined at 400° C. for 4 hours to obtain a calcined Li-substituted zirconium phosphate (C1). The composition of the calcined Li-substituted zirconium phosphate (C1) was $ZrO_2 \cdot P_2O_5 \cdot 0.5Li_2O$ having an introduction amount of Li ions of 3.57 meq/g. The mass ratio ($Li/PO_4$) of lithium atoms to phosphate groups $PO_4$ in this composition is 0.037. (Comparative Example 1)

<Production Example 26> Synthesis of Calcined Li-Substituted Zirconium Phosphate (C2)

70 g of α-zirconium phosphate (1) obtained in Production Example 1 was added to 4,900 mL of 0.1N LiOH aqueous solution while stirring. This was stirred for 8 hours, then filtered through a filter and washed with water until the conductivity of the filtrate became 500 μS/cm or less. This was vacuum-dried at 150° C. for 20 hours to obtain a lithium ion-substituted α-zirconium phosphate (7). This was calcined at 400° C. for 4 hours to obtain a calcined Li-substituted zirconium phosphate (C2). The composition of the calcined Li-substituted zirconium phosphate (C2) was $ZrO_2 \cdot P_2O_5 \cdot 0.9Li_2O$ having an introduction amount of Li ions of 6.16 meq/g. The mass ratio ($Li/PO_4$) of lithium atoms to phosphate groups $PO_4$ in this composition is 0.066. (Comparative Example 2)

<Production Example 27> Synthesis of Calcined Li-Substituted α-Zirconium Phosphate (C3)

20 g of α-zirconium phosphate obtained in Production Example 1 was mixed with 2.94 g of LiOH in a mortar. 25 g of pure water was added thereto and mixed well. The mixture was dried at 150° C. for 12 hours and further calcined at 400° C. for 4 hours to obtain a calcined Li-substituted α-zirconium phosphate (13). The composition of the calcined Li-substituted α-zirconium phosphate (C3) was $ZrO_2 \cdot P_2O_5 \cdot 0.5Li_2O$. The mass ratio ($Li/PO_4$) of lithium atoms to phosphoric acid groups $PO_4$ in this composition is 0.037. (Comparative Example 3)

<Production Example 28> Synthesis of Calcined Li-Substituted α-Zirconium Phosphate (C4)

20 g of α-zirconium phosphate obtained in Production Example 1 was mixed with 5.28 g of LiOH in a mortar. 25 g of pure water was added thereto and mixed well. The mixture was dried at 150° C. for 12 hours and further calcined at 400° C. for 4 hours to obtain a calcined Li-substituted α-zirconium phosphate (14). The composition of the calcined Li-substituted α-zirconium phosphate (C4) was $ZrO_2 \cdot P_2O_5 \cdot 0.9Li_2O$ having an introduction amount of Li ions of 3.57 meq/g. The mass ratio ($Li/PO_4$) of lithium atoms to phosphoric acid groups $PO_4$ in this composition is 0.066. (Comparative Example 4)

<Production Example 29> Synthesis of Li-Substituted α-Zirconium Phosphate 70 g of α-zirconium phosphate (1) obtained in Production Example 1 was added to 7,000 mL of 0.1N LiOH aqueous solution while stirring. This was further stirred for 8 hours, then filtered through a filter and washed with water until the conductivity of the filtrate became 500 μS/cm or less. After washing, the resultant was vacuum-dried at 150° C. for 20 hours to obtain a lithium ion-substituted α-zirconium phosphate (1). The median diameter was 0.9 μm. This lithium ion-substituted α-zirconium phosphate (1) was $Zr(LiPO_4)_2 \cdot H_2O$ having an introduction amount of Li ions of 6.39 meq/g. The mass ratio ($Li/PO_4$) of lithium atoms to phosphate groups $PO_4$ in this composition is 0.073. (Comparative Example 5)

<Production Example 30> Synthesis of Li-Substituted α-Zirconium Phosphate (2)

A Li-substituted α-zirconium phosphate (2) was obtained in the same manner as in Production Example 29 except that the LiOH solution was changed to 0.15 N. The median diameter was 0.9 μm. The composition of the Li-substituted α-zirconium phosphate (2) was $ZrO_2 \cdot 0.75P_2O_5 \cdot 1.5Li_2O \cdot H_2O$ having an introduction amount of Li ions of 10.25 meq/g. The mass ratio ($Li/PO_4$) of lithium atoms to phosphoric acid groups $PO_4$ in this composition is 0.147. (Comparative Example 6)

Table 3 below shows the moisture content (%), (1) the metal ion trapping capacity (meq/g) in electrolyte, and (2) the metal ion trapping rate (%) in a model electrolyte, and the specific surface area.

All Examples satisfy the requirements for the ion trapping agent of the present embodiment, while Comparative Examples are inferior in either the moisture content or the ion trapping ability.

TABLE 2

| Production Example | Sample | Composition | Theoretical exchange capacity meq/g | Introduction amount of Li ion meq/g | Li ion/ phosphate group mass ratio |
|---|---|---|---|---|---|
| 1 | α-zirconium phosphate (1) | $Zr(HPO_4)_2 \cdot H_2O$ | 6.64 | — | — |
| 2 | Example 1 Calcined Li-substituted α-zirconium phosphate (1) | $ZrO_2 \cdot P_2O_5 \cdot Li_2O$ | | 6.78 | 0.073 |

TABLE 2-continued

| Production Example | | Sample | Composition | Theoretical exchange capacity meq/g | Introduction amount of Li ion meq/g | Li ion/ phosphate group mass ratio |
|---|---|---|---|---|---|---|
| 3 | Example 2 | Calcined Li-substituted α-zirconium phosphate (2) | $ZrO_2 \cdot 0.75P_2O_5 \cdot 1.5Li_2O$ | | 10.93 | 0.147 |
| 4 | Example 3 | Calcined Li-substituted α-zirconium phosphate (3) | $ZrO_2 \cdot 0.6P_2O_5 \cdot 1.8Li_2O$ | | 13.73 | 0.220 |
| 5 | Example 4 | Calcined Li-substituted α-zirconium phosphate (4) | $ZrO_2 \cdot P_2O_5 \cdot Li_2O$ | | 6.78 | 0.730 |
| 6 | Example 5 | Li-substituted α-zirconium phosphate (5) | $ZrO_2 \cdot P_2O_5 \cdot 1.4Li_2O$ | | 9.12 | 0.104 |
| 7 | Example 6 | Calcined Li-substituted α-zirconium phosphate (6) | $ZrO_2 \cdot P_2O_5 \cdot 2.1Li_2O$ | | 12.80 | 0.156 |
| 8 | Example 7 | Calcined Li-substituted α-zirconium phosphate (11) | $ZrO_2 \cdot P_2O_5 \cdot 2.8Li_2O$ | | 18.2 | 0.220 |
| 9 | Example 8 | Calcined Li-substituted α-zirconium phosphate (12) | $ZrO_2 \cdot P_2O_5 \cdot 3.5Li_2O$ | | 21.9 | 0.270 |
| 10 | Example 9 | Calcined Li-substituted α-zirconium phosphate (13) | $ZrO_2 \cdot P_2O_5 \cdot 4.2Li_2O$ | | 25.6 | 0.330 |
| 11 | | α-zirconium phosphate (2) | $Zr(HPO_4)_2 \cdot H_2O$ | 6.64 | — | — |
| 12 | Example 10 | Calcined Li-substituted α-zirconium phosphate (7) | $ZrO_2 \cdot P_2O_5 \cdot Li_2O$ | | 6.78 | 0.073 |
| 13 | Example 11 | Calcined Li-substituted α-zirconium phosphate (8) | $ZrO_2 \cdot P_2O_5 \cdot 1.4Li_2O$ | | 9.12 | 0.136 |
| 14 | Example 12 | Calcined Li-substituted α-zirconium phosphate (9) | $ZrO_2 \cdot P_2O_5 \cdot Li_2O$ | | 6.78 | 0.073 |
| 15 | Example 13 | Calcined Li-substituted α-zirconium phosphate (10) | $ZrO_2 \cdot P_2O_5 \cdot 1.4Li_2O$ | | 9.12 | 0.104 |
| 16 | | α-titanium phosphate | $Ti(HPO_4)_2 \cdot H_2O$ | 7.76 | — | — |
| 17 | Example 14 | Calcined Li-substituted α-titanium phosphate (1) | $TiO_2 \cdot P_2O_5 \cdot Li_2O$ | | 7.94 | 0.073 |
| 18 | Example 15 | Calcined Li-substituted α-titanium phosphate (2) | $TiO_2 \cdot O.75P_2O_5 \cdot 1.5Li_2O$ | | 12.97 | 0.146 |
| 19 | Example 16 | Calcined Li-substituted α-titanium phosphate (3) | $TiO_2 \cdot P_2O_5 \cdot Li_2O$ | | 7.94 | 0.073 |
| 20 | Example 17 | Calcined Li-substituted α-titanium phosphate (4) | $TiO_2 \cdot P_2O_5 \cdot 1.4Li_2O$ | | 10.62 | 0.104 |
| 21 | | α-zirconium phosphate (A) | $Zr(HPO_4)_2 \cdot nH_2O$ | 6.64 | — | — |
| 22 | Example 18 | Calcined Li-substituted α-zirconium phosphate (14) | $ZrO_2 \cdot P_2O_5 \cdot 2.8Li_2O$ | | 18.2 | 0.220 |
| 23 | Example 19 | Calcined Li-substituted α-zirconium phosphate (15) | $ZrO_2 \cdot P_2O_5 \cdot 3.5Li_2O$ | | 21.9 | 0.270 |
| 24 | Example 20 | Calcined Li-substituted α-zirconium phosphate (16) | $ZrO_2 \cdot P_2O_5 \cdot 4.2Li_2O$ | | 25.6 | 0.330 |
| 25 | Comparative Example 1 | Calcined Li-substituted zirconium phosphate (C1) | $ZrO_2 \cdot P_2O_5 \cdot 0.5Li_2O$ | 6.64 | 3.57 | 0.037 |
| 26 | Comparative Example 2 | Calcined Li-substituted zirconium phosphate (C2) | $ZrO_2 \cdot P_2O_5 \cdot 0.9Li_2O$ | | 6.16 | 0.066 |
| 27 | Comparative Example 3 | Calcined Li-substituted α-zirconium phosphate (C3) | $ZrO_2 \cdot P_2O_5 \cdot 0.5Li_2O$ | | 3.57 | 0.037 |
| 28 | Comparative Example 4 | Calcined Li-substituted α-zirconium phosphate (C4) | $ZrO_2 \cdot P_2O_5 \cdot 0.9Li_2O$ | | 6.16 | 0.066 |
| 29 | Comparative Example 5 | Lithium ion-substituted α-zirconium phosphate (1) | $Zr(LiPO_4)_2 \cdot H_2O$ | 6.39 | | 0.073 |
| 30 | Comparative Example 6 | Li-substituted α-zirconium phosphate (2) | $ZrO_2 \cdot 0.75P_2O_5 \cdot 1.5Li_2O \cdot H_2O$ | | 10.25 | 0.147 |

TABLE 3

| | Sample | Moisture content % | Metal ion trapping capacity meq/g | | Ion trapping rate % | | Specific surface area $m^2/g$ |
|---|---|---|---|---|---|---|---|
| | | | $Co^{2+}$ | $Mn^{2+}$ | $Co^{2+}$ | $Mn^{2+}$ | |
| Example 1 | Calcined Li-substituted α-zirconium phosphate (1) | 0.4 | 2.4 | 2.5 | 43.0 | 70.0 | 40.0 |
| Example 2 | Calcined Li-substituted α-zirconium phosphate (2) | 0.4 | 3.4 | 3.6 | 55.0 | 85.0 | 80.0 |
| Example 3 | Calcined Li-substituted α-zirconium phosphate (3) | 0.4 | 4.0 | 4.2 | 59.0 | 90.0 | 100.0 |
| Example 4 | Calcined Li-substituted α-zirconium phosphate (4) | 0.2 | 2.2 | 2.4 | 50.0 | 80.0 | 30.0 |
| Example 5 | Calcined Li-substituted α-zirconium phosphate (5) | 0.2 | 3.2 | 3.4 | 53.0 | 91.0 | 40.0 |
| Example 6 | Calcined Li-substituted α-zirconium phosphate (6) | 0.2 | 4.0 | 4.2 | 57.0 | 94.0 | 45.0 |
| Example 7 | Calcined Li-substituted α-zirconium phosphate (11) | 0.4 | 4.5 | 4.6 | >99 | 98 | 55.0 |
| Example 8 | Calcined Li-substituted α-zirconium phosphate (12) | 0.5 | 4.9 | 5.0 | >99 | 99 | 80.0 |
| Example 9 | Calcined Li-substituted α-zirconium phosphate (13) | 0.5 | 5.2 | 5.3 | >99 | >99 | 100.0 |
| Example 10 | Calcined Li-substituted α-zirconium phosphate (7) | 0.4 | 2.6 | 2.6 | 45.0 | 75.0 | 60.0 |
| Example 11 | Calcined Li-substituted α-zirconium phosphate (8) | 0.4 | 3.6 | 3.6 | 56.0 | 89.0 | 85.0 |
| Example 12 | Calcined Li-substituted α-zirconium phosphate (9) | 0.2 | 2.6 | 2.4 | 58.0 | 83.0 | 35.0 |

TABLE 3-continued

| Sample | | Moisture content % | Metal ion trapping capacity meq/g | | Ion trapping rate % | | Specific surface area m²/g |
| --- | --- | --- | --- | --- | --- | --- | --- |
| | | | $Co^{2+}$ | $Mn^{2+}$ | $Co^{2+}$ | $Mn^{2+}$ | |
| Example 13 | Calcined Li-substituted α-zirconium phosphate (10) | 0.2 | 3.2 | 3.4 | 70.0 | 92.0 | 45.0 |
| Example 14 | Calcined Li-substituted α-titanium phosphate (1) | 0.4 | 2.6 | 2.6 | 45.0 | 78.0 | 42.0 |
| Example 15 | Calcined Li-substituted α-titanium phosphate (2) | 0.5 | 3.6 | 3.8 | 58.0 | 89.0 | 78.0 |
| Example 16 | Calcined Li-substituted α-titanium phosphate (3) | 0.3 | 2.7 | 2.6 | 52.0 | 82.0 | 34.0 |
| Example 17 | Calcined Li-substituted α-titanium phosphate (4) | 0.3 | 3.7 | 3.6 | 56.0 | 92.0 | 43.0 |
| Example 18 | Calcined Li-substituted α-zirconium phosphate (14) | 0.6 | 4.2 | 4.3 | >99 | >99 | 110.0 |
| Example 19 | Calcined Li-substituted α-zirconium phosphate (15) | 0.7 | 4.7 | 4.7 | >99 | >99 | 115.0 |
| Example 20 | Calcined Li-substituted α-zirconium phosphate (16) | 0.8 | 4.9 | 5.0 | >99 | >99 | 118.0 |
| Comparative Example 1 | Calcined Li-substituted α-zirconium phosphate (C1) | 0.3 | 0.5 | 0.4 | 15.0 | 30.0 | 12.0 |
| Comparative Example 2 | Calcined Li-substituted α-zirconium phosphate (C2) | 0.2 | 0.8 | 0.7 | 21.0 | 45.0 | 18.0 |
| Comparative Example 3 | Calcined Li-substituted α-zirconium phosphate (C3) | 0.2 | 0.5 | 0.4 | 16.0 | 30.0 | 13.0 |
| Comparative Example 4 | Calcined Li-substituted α-zirconium phosphate (C4) | 0.2 | 0.7 | 0.6 | 19.0 | 40.0 | 15.0 |
| Comparative Example 5 | Li-substituted α-zirconium phosphate (1) | 5.5 | 1.2 | 1.3 | 25.0 | 50.0 | 50.0 |
| Comparative Example 6 | Li-substituted α-zirconium phosphate (2) | 6.1 | 1.5 | 1.7 | 30.0 | 60.0 | 110.0 |

As is clear from Table 2, it is found that, while a conventional trapping agent has a small ion trapping capacity of from 0.4 to 1.7 meq/g, the ion trapping agent of the present embodiment has a large ion trapping capacity of from 2.2 to 4.2 meq/g and is excellent in ion trapping ability.

As is clear from Table 3, it is found that, also in a test using a model electrolyte, the ion trapping agent of the present embodiment has a higher ion trapping rate than the conventional ion trapping agents (Comparative Examples 1 to 6). From these results, the ion trapping agent of the present embodiment has a high ion trapping rate and a high ion trapping capacity, and therefore, occurrence of a short circuit can be suppressed.

2. Preparation of Lithium Ion Secondary Battery

Example 101

First, a separator, a positive electrode, and a negative electrode were prepared, and then, a lithium ion secondary battery was produced using the positive electrode, the negative electrode, and the separator, and an electrolyte.

(1) Preparation of Separator

For the separator, a porous polyethylene film having a thickness of 20 μm and a porosity of from 50% to 60% was used.

The calcined Li-substituted α-zirconium phosphate (1) obtained in Example 1, polyvinyl alcohol (average degree of polymerization 1,700, saponification degree 99% or more), and ion-exchanged water were each mixed in a mass ratio of 5:95:100. This was put into a polypropylene container together with zirconium oxide beads ("Torayceram" (registered trademark) beads manufactured by TORAY INDUSTRIES, INC., diameter 0.5 mm), the aqueous solution was mixed using Paint Shaker (manufactured by Toyo Seiki Co., Ltd.) for 4 hours, and the calcined Li-substituted α-zirconium phosphate (1) of Example 1 was dispersed in the binder. The solution was then filtered through a filter having a filtration limit of 5 μm to obtain an ion trapping agent processing liquid (a). Next, the ion trapping agent processing liquid (a) was applied onto one side of the polyethylene film that is a separator by a gravure coating method so as to have a thickness of 10 μm, and dried by passing the film through a hot air drying oven at 50° C. for 10 seconds to obtain a separator for a battery (S1). The final thickness of the separator was 25 μm. This separator (S1) was calcined at 1,000° C. for 2 hours, and the weight per unit area of the total calcined Li-substituted α-zirconium phosphate (1) was calculated from the calcined residue to be 1 mg/cm².

Example 102

An ion trapping agent processing liquid was prepared and a separator was produced in the same manner as in Example 101 except that the calcined Li-substituted α-zirconium phosphate (2) of Example 2 was used instead of the calcined Li-substituted α-zirconium phosphate (1) of Example 1. The thickness of the obtained separator (S2) was 25 μm. The separator (S2) was calcined at 1,000° C. for 2 hours, and the weight per unit area of the total calcined Li-substituted α-zirconium phosphate (2) was calculated from the calcined residue to be 1.1 mg/cm².

Example 103

An ion trapping agent processing liquid was prepared and a separator was produced in the same manner as in Example 101 except that the calcined Li-substituted α-zirconium phosphate (3) of Example 3 was used instead of the calcined Li-substituted α-zirconium phosphate (1) of Example 1. The thickness of the obtained separator (S3) was 25 μm. The separator (S3) was calcined at 1,000° C. for 2 hours, and the weight per unit area of the total calcined Li-substituted α-zirconium phosphate (3) was calculated from the calcined residue to be 1.0 mg/cm².

Example 104

An ion trapping agent processing liquid was prepared and a separator was produced in the same manner as in Example 101 except that the calcined Li-substituted α-zirconium phosphate (4) of Example 4 was used instead of the calcined Li-substituted α-zirconium phosphate (1) of Example 1. The thickness of the obtained separator (S4) was 25 μm. The separator (S4) was calcined at 1,000° C. for 2 hours, and the weight per unit area of the total calcined Li-substituted α-zirconium phosphate (4) was calculated from the calcined residue to be 1.0 mg/cm².

Example 105

An ion trapping agent processing liquid was prepared and a separator was produced in the same manner as in Example 101 except that the calcined Li-substituted α-zirconium phosphate (5) of Example 5 was used instead of the calcined Li-substituted α-zirconium phosphate (1) of Example 1. The thickness of the obtained separator (S5) was 25 μm. The separator (S5) was calcined at 1,000° C. for 2 hours, and the weight per unit area of the total calcined Li-substituted α-zirconium phosphate (5) was calculated from the calcined residue to be 1.0 mg/cm².

Example 106

An ion trapping agent processing liquid was prepared and a separator was produced in the same manner as in Example 101 except that the calcined Li-substituted α-zirconium phosphate (6) of Example 6 was used instead of the calcined Li-substituted α-zirconium phosphate (1) of Example 1. The thickness of the obtained separator (S6) was 25 μm. The separator (S6) was calcined at 1,000° C. for 2 hours, and the weight per unit area of the total calcined Li-substituted α-zirconium phosphate (6) was calculated from the calcined residue to be 1.1 mg/cm².

Example 107

An ion trapping agent processing liquid was prepared and a separator was produced in the same manner as in Example 101 except that the calcined Li-substituted α-zirconium phosphate (7) of Example 7 was used instead of the calcined Li-substituted α-zirconium phosphate (1) of Example 1. The thickness of the obtained separator (S7) was 25 μm. The separator (S7) was calcined at 1,000° C. for 2 hours, and the weight per unit area of the total calcined Li-substituted α-zirconium phosphate (7) was calculated from the calcined residue to be 1.0 mg/cm².

Example 108

An ion trapping agent processing liquid was prepared and a separator was produced in the same manner as in Example 101 except that the calcined Li-substituted α-zirconium phosphate (8) of Example 8 was used instead of the calcined Li-substituted α-zirconium phosphate (1) of Example 1. The thickness of the obtained separator (S8) was 25 μm. The separator (S8) was calcined at 1,000° C. for 2 hours, and the weight per unit area of the total calcined Li-substituted α-zirconium phosphate (8) was calculated from the calcined residue to be 1.1 mg/cm².

Example 109

An ion trapping agent processing liquid was prepared and a separator was produced in the same manner as in Example 101 except that the calcined Li-substituted α-zirconium phosphate (9) of Example 9 was used instead of the calcined Li-substituted α-zirconium phosphate (1) of Example 1. The thickness of the obtained separator (S9) was 25 μm. The separator (S9) was calcined at 1,000° C. for 2 hours, and the weight per unit area of the total calcined Li-substituted α-zirconium phosphate (9) was calculated from the calcined residue to be 1.0 mg/cm².

Example 110

An ion trapping agent processing liquid was prepared and a separator was produced in the same manner as in Example 101 except that the calcined Li-substituted α-zirconium phosphate (10) of Example 10 was used instead of the calcined Li-substituted α-zirconium phosphate (1) of Example 1. The thickness of the obtained separator (S10) was 25 μm. The separator (S10) was calcined at 1,000° C. for 2 hours, and the weight per unit area of the total calcined Li-substituted α-zirconium phosphate (10) was calculated from the calcined residue to be 1.0 mg/cm².

Example 111

An ion trapping agent processing liquid was prepared and a separator was produced in the same manner as in Example 101 except that the calcined Li-substituted α-titanium phosphate (1) of Example 11 was used instead of the calcined Li-substituted α-zirconium phosphate (1) of Example 1. The thickness of the obtained separator (S11) was 25 μm. The separator (S11) was calcined at 1,000° C. for 2 hours, and the weight per unit area of the total calcined Li-substituted α-titanium phosphate (1) of Example 11 was calculated from the calcined residue to be 1.0 mg/cm².

Example 112

An ion trapping agent processing liquid was prepared and a separator was produced in the same manner as in Example 101 except that the calcined Li-substituted α-titanium phosphate (2) of Example 12 was used instead of the calcined Li-substituted α-zirconium phosphate (1) of Example 1. The thickness of the obtained separator (S12) was 25 μm. The separator (S12) was calcined at 1,000° C. for 2 hours, and the weight per unit area of the total calcined Li-substituted α-titanium phosphate (2) was calculated from the calcined residue to be 1.0 mg/cm².

Example 113

An ion trapping agent processing liquid was prepared and a separator was produced in the same manner as in Example 101 except that the calcined Li-substituted α-titanium phosphate (3) of Example 13 was used instead of the calcined Li-substituted α-zirconium phosphate (1) of Example 1. The thickness of the obtained separator (S13) was 25 μm. The separator (S13) was calcined at 1,000° C. for 2 hours, and the weight per unit area of the total calcined Li-substituted α-titanium phosphate (3) was calculated from the calcined residue to be 1.1 mg/cm².

Example 114

An ion trapping agent processing liquid was prepared and a separator was produced in the same manner as in Example 101 except that the calcined Li-substituted α-titanium phosphate (4) of Example 14 was used instead of the calcined Li-substituted α-zirconium phosphate (1) of Example 1. The thickness of the obtained separator (S14) was 25 μm. The separator (S14) was calcined at 1,000° C. for 2 hours, and the weight per unit area of the total calcined Li-substituted α-titanium phosphate (4) was calculated from the calcined residue to be 1.1 mg/cm².

Comparative Example 101

A separator (S15) containing no ion trapping agent was prepared.

Comparative Example 102

An ion trapping agent processing liquid was prepared and a separator was produced in the same manner as in Example 101 except that alumina particles with a median diameter of 1 μm were used instead of the calcined Li-substituted α-zirconium phosphate (1) of Example 1. The thickness of the obtained separator (S16) was 25 μm. The separator (S16) was calcined at 1,000° C. for 2 hours, and the weight per unit area of the total alumina was calculated from the calcined residue to be 1.6 mg/cm².

Comparative Example 103

An ion trapping agent processing liquid was prepared and a separator was produced in the same manner as in Example 101 except that the calcined Li-substituted α-zirconium phosphate (C1) of Comparative Example 1 was used instead of the calcined Li-substituted α-zirconium phosphate (1) of Example 1. The thickness of the obtained separator (S17) was 25 μm. The separator (S17) was calcined at 1,000° C. for 2 hours, and the weight per unit area of the total calcined Li-substituted α-zirconium phosphate (C1) was calculated from the calcined residue to be 1.0 mg/cm².

Comparative Example 104

An ion trapping agent processing liquid was prepared and a separator was produced in the same manner as in Example 101 except that the calcined Li-substituted α-zirconium phosphate (C2) of Comparative Example 2 was used instead of the calcined Li-substituted α-zirconium phosphate (1) of Example 1. The thickness of the obtained separator (S18) was 25 μm. The separator (S18) was calcined at 1,000° C. for 2 hours, and the weight per unit area of the total calcined Li-substituted α-zirconium phosphate (C2) was calculated from the calcined residue to be 0.9 mg/cm².

Comparative Example 105

An ion trapping agent processing liquid was prepared and a separator was produced in the same manner as in Example 101 except that the calcined Li-substituted α-zirconium phosphate (C3) of Comparative Example 3 was used instead of the calcined Li-substituted α-zirconium phosphate (1) of Example 1. The thickness of the obtained separator (S19) was 25 μm. The separator (S19) was calcined at 1,000° C. for 2 hours, and the weight per unit area of the total calcined Li-substituted α-zirconium phosphate (C3) was calculated from the calcined residue to be 1.1 mg/cm².

Comparative Example 106

An ion trapping agent processing liquid was prepared and a separator was produced in the same manner as in Example 101 except that the calcined Li-substituted α-zirconium phosphate (C4) of Comparative Example 4 was used instead of the calcined Li-substituted α-zirconium phosphate (1) of Example 1. The thickness of the obtained separator (S20) was 25 μm. The separator (S20) was calcined at 1,000° C. for 2 hours, and the weight per unit area of the total calcined Li-substituted α-zirconium phosphate (C4) was calculated from the calcined residue to be 0.9 mg/cm².

Comparative Example 107

An ion trapping agent processing liquid was prepared and a separator was produced in the same manner as in Example 101 except that the Li-substituted α-zirconium phosphate (1) of Comparative Example 5 was used instead of the calcined Li-substituted α-zirconium phosphate (1) of Example 1. The thickness of the obtained separator (S21) was 25 μm. The separator (S21) was calcined at 1,000° C. for 2 hours, and the weight per unit area of the total Li-substituted α-zirconium phosphate (1) was calculated from the calcined residue to be 1.0 mg/cm².

Comparative Example 108

An ion trapping agent processing liquid was prepared and a separator was produced in the same manner as in Example 101 except that the Li-substituted α-zirconium phosphate (2) of Comparative Example 6 was used instead of the calcined Li-substituted α-zirconium phosphate (1) of Example 1. The thickness of the obtained separator (S22) was 25 μm. The separator (S22) was calcined at 1,000° C. for 2 hours, and the weight per unit area of the total Li-substituted α-zirconium phosphate (2) was calculated from the calcined residue to be 1.1 mg/cm².

(2) Preparation of Positive Electrode

First, 90 parts by mass of $Li(Ni_{1/3}Mn_{1/3}Co_{1/3})O_2$ (positive electrode active material), 7 parts by mass of acetylene black (conductive aid), 3 parts by mass of polyvinylidene fluoride (PVDF) (binder), and 100 parts by mass of 1-methyl-2-pyrrolidone (binder) were mixed and dispersed to obtain a positive electrode material-containing slurry.

Next, this positive electrode mixture slurry was applied onto one surface of a positive electrode current collector having a thickness of 20 μm (aluminum foil) by a doctor blade method in such a manner that the thickness of the coating film was 30 μm, and dried to form a positive electrode mixture layer. The resulting product was then compression-molded by a roll press and cut into a predetermined size (30 mm×45 mm) to obtain a positive electrode for a lithium ion secondary battery.

(3) Preparation of Negative Electrode 90 parts by mass of amorphous carbon (negative electrode active material), 3 parts by mass of polyvinylidene fluoride (PVDF) (binder), 7 parts by mass of carbon black (KUREHA CORPORATION) (conductive aid), and 100 parts by mass of 1-methyl-2-pyrrolidone (solvent) were mixed and dispersed to obtain a negative electrode mixture slurry.

Next, this negative electrode mixture slurry was applied onto one surface of a negative electrode current collector having a thickness of 20 μm (copper foil) by a doctor blade method in such a manner that the thickness of the coating film was 30 μm, and dried to form a negative electrode mixture layer. The resulting product was then compression-molded by a roll press and cut into a predetermined size (31 mm×46 mm) to obtain a negative electrode for a lithium ion secondary battery.

(4) Non-Aqueous Electrolyte

As the non-aqueous electrolyte, an electrolyte (manufactured by Kishida Chemical Co., Ltd.) containing 1 M (mol/L) of $LiPF_6$ as an indicator electrolyte in a solvent prepared by mixing ethylene carbonate (EC) and ethyl methyl carbonate (EMC) in a volume ratio of 3:7 was used.

(5) Preparation of Lithium Ion Secondary Battery

Example 201

The negative electrode, the separator (S1) having a size of 35×50 mm, and the positive electrode were layered in this order such that a side of the ion trapping agent-containing layer of the separator (S1) faces the positive electrode, and the layered body was housed in an aluminum packaging material (packaging material for battery). Next, the non-aqueous electrolyte manufactured by Kishida Chemical Co., Ltd. was injected in such a manner that air was not incorporated therein. Then, in order to seal the contents, an opening of the aluminum packaging material was subjected to heat sealing at 150° C. to obtain a lithium ion secondary battery (L1) having an aluminum laminate exterior of 50 mm×80 mm×6 mm.

(Initialization of Lithium Ion Secondary Battery)

The lithium ion secondary battery prepared above was initialized by the following procedure. First, the lithium ion secondary battery (L1) was charged at a constant current equivalent to 3-hour rate from the open circuit state until the battery voltage reached 4.2V After the battery voltage reached 4.2V, the battery voltage was kept at 4.2V until the current value became equivalent to 0.1-hour rate. These two charging processes are called "charging under standard conditions", and the charged state is called "full charge".

Then, the charging was stopped and the battery was rested for 30 minutes. This process is called "pause".

Then, the discharge at a constant current equivalent to 3-hour rate was started, and the discharge was performed until the battery voltage reached 3.0V. This process is called "discharge under standard conditions".

Then, the discharge was stopped and "pause" was performed. Then, the cycle of "charging under standard conditions", "pause", "discharge under standard conditions", and "pause" was repeated three times. Then, "charging under standard conditions" and "pause" were further performed to start discharge at a constant current equivalent to 3-hour rate, and discharge was performed until the battery voltage reached 3.8V. This state is called "half-charge". Then, an aging period of 1 week was provided and the initialization was completed.

The "time rate" is defined as a current value at which the designed discharge capacity of a battery is discharged in a predetermined time. For example, 3-hour rate is a current value for discharging the designed capacity of the battery in 3 hours. Further, assuming that the battery capacity is C (unit: Ah), the current value of 3-hour rate is C/3 (unit: A).

<Evaluation Method>

(a) Initial Capacity Evaluation

Using the lithium ion secondary battery (L1) after initialization, the cycle of "charging under standard conditions", "pause", "discharge under standard conditions", and "pause" was repeated 3 times, the discharge capacity at each time was measured, and the average value was calculated as "initial capacity". The values shown in Table 4 are values standardized with the average value of the discharge capacity in Comparative Example 14 using the separator containing no ion trapping agent (S11) as "1.00".

(b) Cycle Characteristics Evaluation

The lithium ion secondary battery (L1) of which initial capacity was measured was placed in a constant temperature bath at 40° C., and after the surface temperature of the secondary battery reached 40° C., this state was maintained for 12 hours. Then, the cycle of "charging under standard conditions" and "discharging under standard conditions" was repeated 200 times without providing "pause". Then, the discharge capacity of the secondary battery was measured in the same manner as the "initial capacity". The "post-test capacity" shown in Table 4 is a value when the average value of the discharge capacity of Comparative Example 101 using the separator containing no ion trapping agent (S15) is defined as "1.00". The "post-test capacity" was used to evaluate the cycle characteristics (degree of deterioration due to the cycle test).

(c) Safety Evaluation

The lithium ion secondary battery (L1) after initialization was charged at 4.2 V to be fully charged, and then placed on a constraining plate having a hole with a diameter of 20 mm. The constraining plate was placed on a press provided with a steel nail having a diameter of 3 mm that is attached to a top thereof. The press was driven to pierce the packaging material with the nail, forcing an internal short circuit. In other words, the nail was moved, at a speed of 80 mm/sec, from above until the nail penetrated the lithium ion secondary battery (L1) and the tip of the nail reached the hole of the constraining plate. The battery after pulling out the nail was observed under room temperature and atmospheric conditions. Those which did not ignite or burst within 1 hour were regarded as acceptable and indicated by "A" in Table 4. Those in which sparks occurred within 1 hour were indicated by "B".

In the lithium ion secondary battery (L1), the battery voltage drastically decreased immediately after the nail penetrated the battery to cause a short circuit. Due to a Joule heat generated by the short circuit, the battery temperature and the battery surface temperature in the vicinity of the penetrated portion gradually increased to a maximum temperature of around 150° C., but there was no further significant heat generation, and no thermal runaway occurred.

Examples 201 to 214

Lamicell type lithium ion secondary batteries (L2 to L14) were obtained in the same manner as in Example 201, except that the separators (S2 to S14) of Examples 102 to 114 were used instead of the separator (S1) of Example 1, respectively. Then, in the same manner as in Example 201, evaluation of the initial capacity and the cycle characteristics, and safety tests were performed. The results of the above are shown in Table 4.

In the safety tests, the lithium ion secondary batteries (L2 to L14) of Examples 201 to 214 behaved similarly to the lithium ion secondary battery (L1), respectively.

Comparative Examples 201 to 208

Lamicell type lithium ion secondary batteries (L15 to L22) were obtained in the same manner as in Example 201, except that the separators (S15 to S22) of Comparative Examples 102 to 108 were used instead of the separator (S1)

of Example 1, respectively. Then, in the same manner as in Example 201, evaluation of the initial capacity and the cycle characteristics, and safety tests were performed. The results of the above are shown in Table 4.

In the safety tests, the lithium ion secondary batteries (L2 to L14) of Comparative Examples 102 to 108 behaved similarly to the lithium ion secondary battery (L1), respectively. On the other hand, in the safety test of the lithium ion secondary battery (L15) of Comparative Example 101, the battery voltage drastically decreased immediately after the nail penetrated the battery to cause a short circuit. The battery temperature and the battery surface temperature in the vicinity of the penetrated portion increased rapidly, causing a thermal runaway and reaching a maximum temperature of 400° C. or more about 40 seconds after the nail was pulled out. After the thermal runaway, sparks were generated from the penetrated portion and hot smoke was emitted.

battery, the ion trapping agent being a layered phosphate compound that includes a proton as an ion exchange group, that supports lithium ions in excess of a theoretical exchange capacity of the layered phosphate compound, and that has no water of crystallization does not show a decrease in battery capacity and has excellent battery characteristics. The battery is also excellent in safety.

The ion trapping agent of the present embodiment can be used for a steel member of a lithium ion secondary battery such as an electrolyte or a separator. For example, the separator containing the ion trapping agent of the present embodiment can be applied to an electrochemical element other than lithium ion secondary batteries, such as a lithium ion capacitor (hybrid capacitor) having a structure in which a positive electrode is in a form of an electric double layer and a negative electrode is in a form of a lithium ion secondary battery, or a metallic lithium secondary battery.

TABLE 4

| | | Separator | | Battery | | |
|---|---|---|---|---|---|---|
| | | Ion trapping agent | Phosphate compound weight per unit area mg/cm$^2$ | Initial capacity (Ah) | Post-test capacity (Ah) | Nail penetration test |
| Example 201 | S1 | Calcined Li-substituted α-zirconium phosphate (1) | 1.0 | L1 | 1.0 | 1.0 | A |
| Example 202 | S2 | Calcined Li-substituted α-zirconium phosphate (2) | 1.1 | L2 | 1.0 | 1.0 | A |
| Example 203 | S3 | Calcined Li-substituted α-zirconium phosphate (3) | 1.0 | L3 | 1.0 | 1.0 | A |
| Example 204 | S4 | Calcined Li-substituted α-zirconium phosphate (4) | 1.0 | L4 | 1.0 | 1.0 | A |
| Example 205 | S5 | Calcined Li-substituted α-zirconium phosphate (5) | 1.0 | L5 | 1.0 | 1.0 | A |
| Example 206 | S6 | Calcined Li-substituted α-zirconium phosphate (6) | 1.1 | L6 | 1.0 | 1.0 | A |
| Example 207 | S7 | Calcined Li-substituted α-zirconium phosphate (7) | 1.0 | L7 | 1.0 | 1.0 | A |
| Example 208 | S8 | Calcined Li-substituted α-zirconium phosphate (8) | 1.1 | L8 | 1.0 | 1.0 | A |
| Example 209 | S9 | Calcined Li-substituted α-zirconium phosphate (9) | 1.0 | L9 | 1.0 | 1.0 | A |
| Example 210 | S10 | Calcined Li-substituted α-zirconium phosphate (10) | 1.0 | L10 | 1.0 | 1.0 | A |
| Example 211 | S11 | Calcined Li-substituted α-titanium phosphate (1) | 1.0 | L11 | 1.0 | 1.0 | A |
| Example 212 | S12 | Calcined Li-substituted α-titanium phosphate (2) | 1.0 | L12 | 1.0 | 1.0 | A |
| Example 213 | S13 | Calcined Li-substituted α-titanium phosphate (3) | 1.1 | L13 | 1.0 | 1.0 | A |
| Example 214 | S14 | Calcined Li-substituted α-titanium phosphate (4) | 1.0 | L14 | 1.0 | 1.0 | A |
| Comparative Example 201 | S15 | None | — | L15 | 1.0 | 0.7 | B |
| Comparative Example 202 | S16 | Alumina | 1.6 | L16 | 1.0 | 0.7 | A |
| Comparative Example 203 | S17 | Calcined Li-substituted α-zirconium phosphate (C1) | 1.0 | L17 | 1.0 | 0.8 | A |
| Comparative Example 204 | S18 | Calcined Li-substituted α-zirconium phosphate (C2) | 0.9 | L18 | 1.0 | 0.7 | A |
| Comparative Example 205 | S19 | Calcined Li-substituted α-zirconium phosphate (C3) | 1.1 | L19 | 1.0 | 0.8 | A |
| Comparative Example 206 | S20 | Calcined Li-substituted α-zirconium phosphate (C4) | 0.9 | L20 | 1.0 | 0.7 | A |
| Comparative Example 207 | S21 | Li-substituted α-zirconium phosphate (1) | 1.0 | L21 | 1.0 | 0.6 | A |
| Comparative Example 208 | S22 | Li-substituted α-zirconium phosphate (2) | 1.1 | L22 | 1.0 | 0.6 | A |

As is clear from Table 4, the lithium ion secondary battery containing anion trapping agent for a lithium ion secondary The lithium ion secondary battery of the present embodiment can be used as a paper type battery, a button type battery, a coin type battery, a laminated type battery, a cylindrical type battery, a square type battery, or the like for a portable device such as a mobile phone, a tablet terminal, a laptop computer, or a game console; a vehicle such as an electric vehicle or a hybrid electric vehicle; a power storage, or the like.

REFERENCE LIST

10: Storage element with lead, 15: Porous base material, 20: Separator, 30: Positive electrode, 32: Positive electrode current collector, 34: Positive electrode active material layer, 40: Negative electrode, 42: Negative electrode current collector, 44: Negative electrode active material layer, 52, 54: Lead, 60: Ion trapping agent

What is claimed is:

1. An ion trapping agent which is a layered phosphate compound that comprises a proton as an ion exchange group, that supports lithium ions in excess of a theoretical exchange capacity of the layered phosphate compound, and that has no water of crystallization,
wherein the layered phosphate compound is α-zirconium phosphate or α-titanium phosphate, and
wherein the α-zirconium phosphate is a compound represented by the following formula (1):

$ZrO_2 \cdot nP_2O_5 \cdot xLi_2O$ (1)

wherein, in Formula (1), n is a positive number of from 0.5 to 1.5, x is a positive number of from 0.8 to 2.2, and n is equal to or smaller than x; and
wherein the α-titanium phosphate is a compound represented by the following Formula (2):

$TiO_2 \cdot xP_2O_5 \cdot nLi_2O$ (2)

wherein, in Formula (2), n is a positive number of from 0.5 to 1.5, x is a positive number of from 0.8 to 2.2, and n is equal to or smaller than x.

2. The ion trapping agent according to claim 1, wherein a mass ratio (Li/PO$_4$) of lithium atoms with respect to phosphate groups PO$_4$ contained in the layered phosphate compound is 0.07 or more.

3. The ion trapping agent according to claim 1, wherein a specific surface area of the layered phosphate compound is 15 m$^2$/g or more.

4. The ion trapping agent according to claim 1, wherein a moisture content of the layered phosphate compound is 1% by mass or less.

5. A separator for a lithium ion battery, the separator comprising an ion trapping layer that contains the ion trapping agent according to claim 1.

6. A lithium ion secondary battery comprising a positive electrode, a negative electrode, and an electrolyte, the lithium ion secondary battery containing the ion trapping agent according to claim 1.

7. The ion trapping agent according to claim 1, wherein a mass ratio (Li/PO$_4$) of lithium atoms with respect to phosphate groups PO$_4$ contained in the layered phosphate compound is from 0.10 to 0.33.

8. The ion trapping agent according to claim 1, wherein an amount of lithium ions substituted with respect to the compound of Formula (1) is from 7.5 to 15 meq/g.

9. The ion trapping agent according to claim 1, wherein an amount of lithium ions substituted with respect to the compound of Formula (1) is from 8 to 12 meq/g.

10. The ion trapping agent according to claim 1, wherein an amount of lithium ions substituted with respect to the compound of Formula (2) is from 7.5 to 15 meq/g.

11. The ion trapping agent according to claim 1, wherein an amount of lithium ions substituted with respect to the compound of Formula (2) is from 8 to 12 meq/g.

* * * * *